US011005386B2

(12) United States Patent
Leong

(10) Patent No.: US 11,005,386 B2
(45) Date of Patent: May 11, 2021

(54) POWER CONVERTER CIRCUIT AND POWER CONVERSION METHOD

(71) Applicant: Infineon Technologies, Villach (AT)

(72) Inventor: Kennith Kin Leong, Villach (AT)

(73) Assignee: Infineon Technologies Austria AG, Villach (AT)

( * ) Notice: Subject to any disclaimer, the term of this patent is extended or adjusted under 35 U.S.C. 154(b) by 122 days.

(21) Appl. No.: 16/439,811

(22) Filed: Jun. 13, 2019

(65) Prior Publication Data

US 2019/0386579 A1    Dec. 19, 2019

(30) Foreign Application Priority Data

Jun. 18, 2018 (DE) .......................... 102018114589.6

(51) Int. Cl.
*H02M 7/219* (2006.01)
*H02M 1/08* (2006.01)
*H02M 7/06* (2006.01)

(52) U.S. Cl.
CPC ............. *H02M 7/219* (2013.01); *H02M 1/08* (2013.01); *H02M 7/06* (2013.01)

(58) Field of Classification Search
CPC ........... H02M 7/219; H02M 7/06; H02M 1/08
See application file for complete search history.

(56) References Cited

U.S. PATENT DOCUMENTS

| 9,660,520 B2 * | 5/2017 | Perreault | H02M 1/4225 |
| 2004/0202012 A1 * | 10/2004 | Ferens | H02M 3/335 363/65 |
| 2007/0115704 A1 | 5/2007 | Ito | |
| 2011/0170325 A1 * | 7/2011 | Jungreis | H02M 7/219 363/127 |
| 2012/0044728 A1 * | 2/2012 | Yatsu | H02M 7/219 363/126 |
| 2018/0138714 A1 * | 5/2018 | Vogel | H02J 7/0068 |

FOREIGN PATENT DOCUMENTS

DE        102017216468 A1    3/2019

* cited by examiner

*Primary Examiner* — Fred E Finch, III
*Assistant Examiner* — Kevin H Sprenger
(74) *Attorney, Agent, or Firm* — Murphy, Bilak & Homiller, PLLC

(57) ABSTRACT

A power converter circuit includes a plurality of input nodes, an output, a plurality of switch and inductor circuits, a plurality of rectifier circuits, a first capacitor network, and a second capacitor network. Each of the plurality of switch and inductor circuits is connected between a respective pair of the plurality of input nodes, and each of the plurality of rectifier circuits is connected between a respective one of the plurality of switch and inductor circuits and the output. The first capacitor network includes at least two capacitors connected between at least one of the plurality of input nodes and the output, and the second capacitor network includes at least one capacitor and is connected to the output. A capacitance of the at least one capacitor of the second capacitor network is greater than a capacitance of each of the at least two capacitors of the first capacitor network.

18 Claims, 18 Drawing Sheets

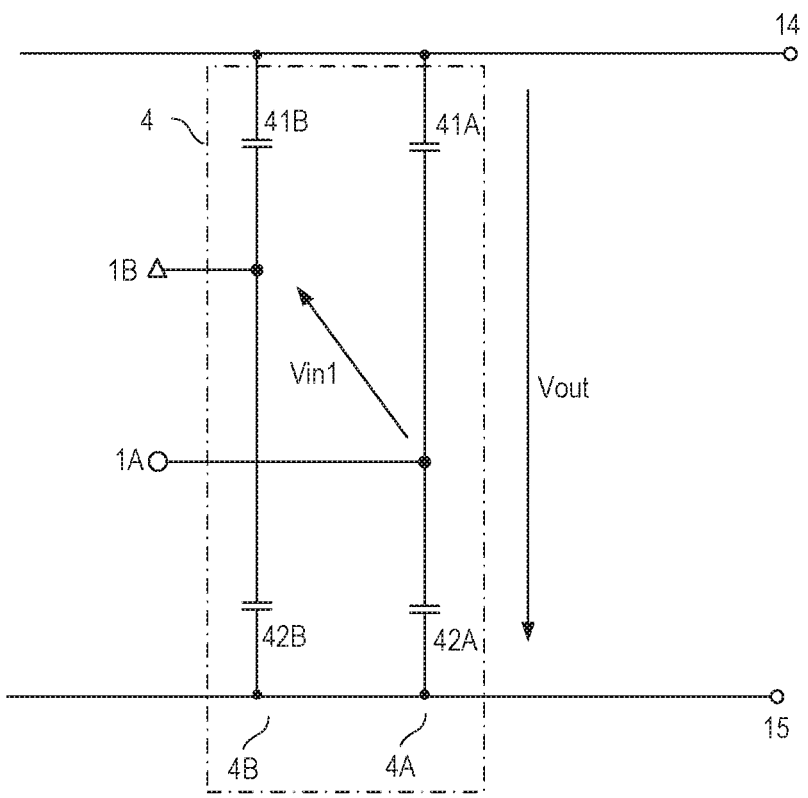
FIG 4
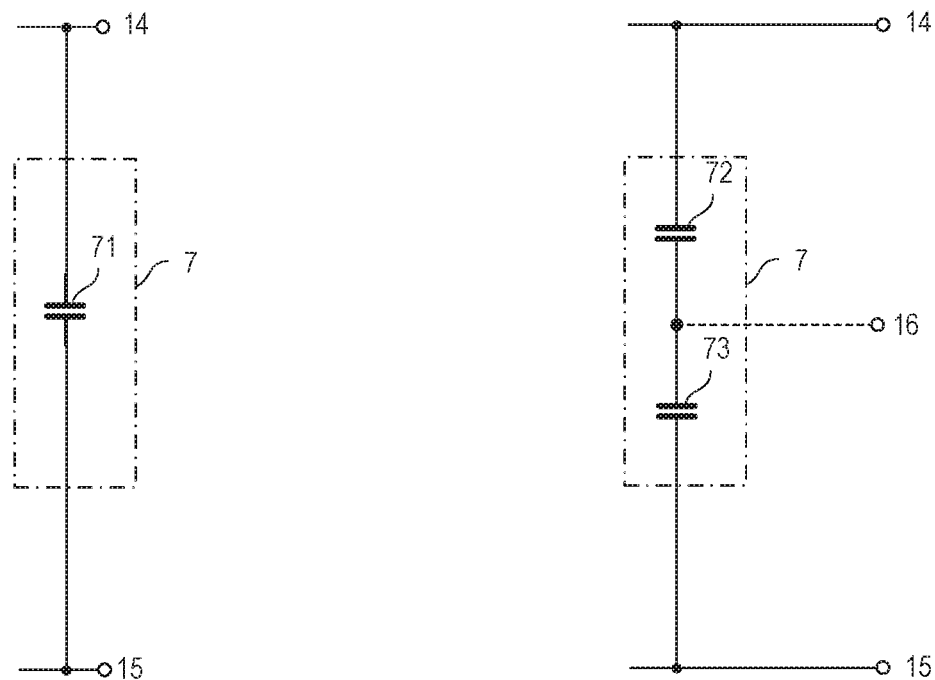
FIG 5
FIG 6 ured to receive an AC (alternating current) input voltage and provide a DC (direct current) output voltage. Some types of AC-DC power converters have a so-called "voltage doubler" topology. In this type of power converter, a voltage level of the output voltage is at least twice an amplitude of the input voltage. Examples of power converters with a voltage doubler topology include power converters including a "VIENNA rectifier" topology.

SUMMARY

There is a need to provide a power converter circuit that is configured to receive an alternating input voltage and supply a direct output voltage with a voltage level that is lower than twice the amplitude of the input voltage.

One example relates to a power converter circuit. The power converter circuit includes a plurality of input nodes, an output, a plurality of switch and inductor circuits, a plurality of rectifier circuits, a first capacitor network, and a second capacitor network. Each of the plurality of switch and inductor circuits is connected between a respective pair of the plurality of input nodes, and each of the plurality of rectifier circuits is connected between a respective one of the plurality of switch and inductor circuits and the output. The first capacitor network includes at least two capacitors connected between at least one of the plurality of input nodes and the output, and the second capacitor network includes at least one capacitor and is connected to the output. Further, a capacitance of the at least one capacitor of the second capacitor network is greater than a capacitance of each of the at least two capacitors of the first capacitor network.

Another example relates to a method. The method includes converting power by a power converter, wherein the power converter includes a plurality of input nodes, an output, a plurality of switch and inductor circuits, a plurality of rectifier circuits, a first capacitor network, and a second capacitor network. Converting power includes receiving at least one alternating input voltage at the plurality of input nodes. In the power converter, each of the plurality of switch and inductor circuits is connected between a respective pair of the plurality of input nodes, and each of the plurality of rectifier circuits is connected between a respective one of the plurality of switch and inductor circuits and the output. The first capacitor network includes at least two capacitors connected between at least one of the plurality of input nodes and the output, and the second capacitor network includes at least one capacitor and is connected to the output. Further, a capacitance of the at least one capacitor of the second capacitor network is greater than a capacitance of each of the at least two capacitors of the first capacitor network.

POWER CONVERTER CIRCUIT AND POWER CONVERSION METHOD

TECHNICAL FIELD

This disclosure in general relates to a power converter circuit, particularly a switched mode power converter, and a power conversion method.

BACKGROUND

Switched mode power converters (which are often also referred to as switched mode supplies (SMPS)) are widely used in various types of automotive, industrial, household and consumer electronic applications. A switched mode power converter includes at least one electronic switch coupled to at least one inductor. A switched mode power converter is configured to receive an input power, which is given by an input current multiplied with an input voltage, at an input and supply an output power, which is given by an output voltage multiplied with an output current, to a load coupled to an output. By regulating the input power received at the input, the switched mode power converter may regulate at least one operating parameter, for example, the output voltage. The input power may be regulated by regulating a current through the at least one inductor, wherein the inductor current may be regulated by a switched mode operation of the at least one electronic switch.

AC-DC switched mode power converters are config-

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

FIG. 4 shows one example of the first capacitor network;

FIGS. 5 and 6 show different examples of the second capacitor network;

DETAILED DESCRIPTION

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

Figure 1:
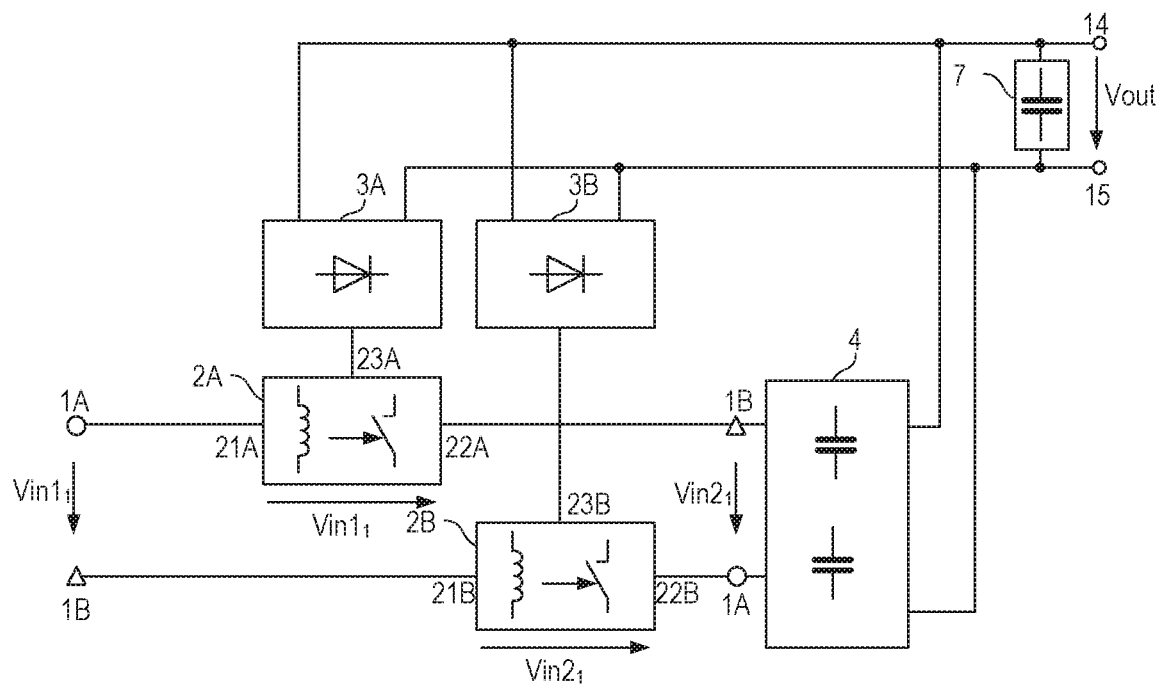
FIG. 1 shows a circuit diagram that illustrates one example of a power converter circuit including a plurality of switch inductor circuits, a plurality of rectifier circuits, a first capacitor network and a second capacitor network.

FIG. 1 shows a circuit diagram of a power converter circuit according to one example. The power converter circuit includes a plurality of input nodes 1A, 1B, an output 14, 15, a plurality of switch and inductor circuits 2A, 2B, and a plurality of rectifier circuits 3A, 3B. Each of the switch and inductor circuits 2A, 2B is connected between a respective pair of the input nodes 1A, 1B, and each of the rectifier circuits 3A, 3B is connected between a respective one of the switch and inductor circuits 2A, 2B and the output 14, 15. Further, a first capacitor network 4 is connected between at least one of the input nodes 1A, 1B and the output 14, 15, and a second capacitor network 7 is connected to the output 14, 15. As will be explained in further detail herein below, the first capacitor network 4 includes at least two capacitors and the second capacitor network 7 includes at least one capacitor. Further, a capacitance of the at least one capacitor of the second capacitor network 7 is greater than a capacitance of each of the at least two capacitors of the first capacitor network 4. According to one example, a capacitance of the at least one capacitor in the second capacitor network 7 is greater than 1E2 ($10^2$) times, greater than 1E3 ($10^3$) times, or greater than 1E4 ($10^4$) times the capacitance of each of the at least two capacitors in the first capacitor network. According to one example, the capacitance of each of the capacitors in the first capacitor network 4 is smaller than 10 microfarads (µf), smaller than 1 microfarad (µf), smaller than 100 nanofarads (nF), or even smaller than 1 nanofarad (nF). This is also explained in further detail herein below.

Referring to FIG. 1, each of the switch and inductor circuits 2A, 2B includes a first input node 21A, 21B and a second input node 22A, 22B. Each of these first and second input nodes 21A-22B is connected to a respective one of the input nodes 1A, 1B. According to one example, the first input nodes 21A, 21B of the switch and inductor circuits 2A, 2B are connected to distinct input nodes 1A, 1B, and the second circuit nodes 22A, 22B of the switch and inductor circuits 2A, 2B are connected to distinct input nodes 1A, 1B. More specifically, in the example shown in FIG. 1, the first input node 21A of a first switch and inductor circuit 2A is connected to the first input node 1A, the second circuit node 22A of the first switch and inductor circuit 2A is connected to the second input node 1B, the first circuit node 21B of a second switch and inductor circuit 2B is connected to the second input node 1B, and the second circuit node 22B of the second switch and inductor circuit 2B is connected to the first input node 1A.

The input nodes 1A, 1B are configured to receive a first input voltage $Vin1_1$ therebetween. Because the first switch and inductor circuit 2A is connected between the first input node 1A and the second input node 1B, a voltage received by the first switch and inductor circuit 2A between the first circuit node 21A and the second circuit node 22A equals the first input voltage $Vin1_1$. The second switch and inductor circuit 2B receives a second voltage $Vin2_1$ between the first circuit node 21B and the second circuit node 22B. This second voltage $Vin2_1$, which is also referred to as second input voltage in the following, is the inverted first input voltage $Vin1_1$, that is, $Vin2_1 = -Vin1_1$. According to one example, the first input voltage $Vin1_1$ is an alternating voltage. In this case, there is a phase shift of 180° between the first input voltage $Vin1_1$ and the second input voltage $Vin2_1$.

Figure 2:
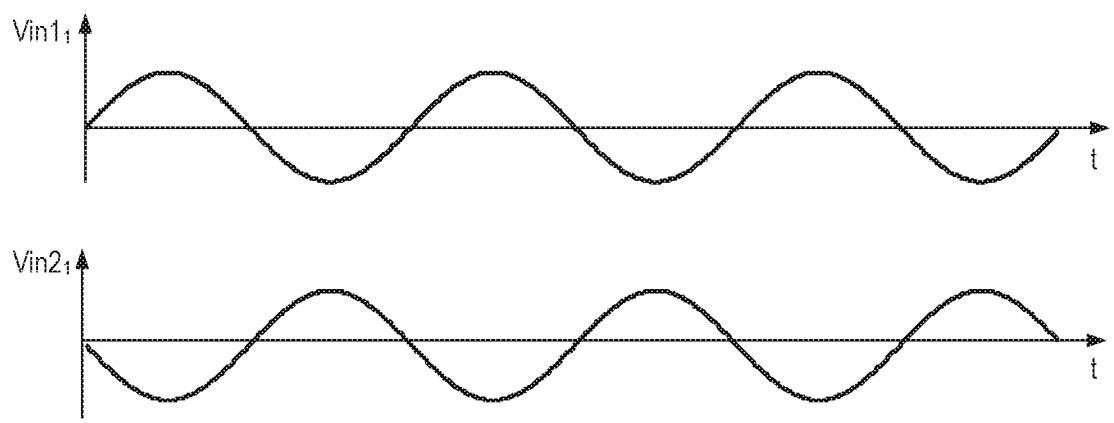
FIG. 2 shows timing diagrams that illustrate examples of supply voltages that may be received by a power converter circuit of the type shown in FIG. 1.
Figure 3:
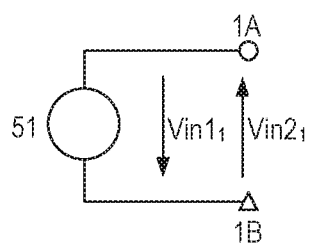
FIG. 3 shows one example of a power source configured to provide supply voltages to a power converter circuit of the type shown in FIG. 1.

According to one example, the first input voltage $Vin1_1$ is a sinusoidal voltage. In this case, the first input voltage $Vin1_1$ and the second input voltage $Vin2_1$ can be expressed as:

$$Vin1_1 = v_0 \cdot \sin(2\pi \cdot f \cdot t) \tag{1a}$$

$$Vin2_1 = v_0 \cdot \sin(2\pi \cdot f \cdot t + 180°) \tag{1b},$$

where $v_0$ is the amplitude of the input voltages $Vin1_1$, $Vin2_1$, $f$ is the frequency and t is the time. Examples of sinusoidal first and second input voltages $Vin1_1$, $Vin2_1$ are shown in FIG. 2. Referring to FIG. 3, these input voltages $Vin1_1$, $Vin2_1$ can be generated by an alternating voltage source 51 connected between the first input node 1A and the second input node 1B.

Referring to the above, each of the rectifier circuits 3A, 3B is connected between a respective one of the switch and inductor circuits 2A, 2B and the output 14, 15. More specifically, in the example shown in FIG. 1, a first one 3A of the rectifier circuits 3A, 3B is connected between a first one 2A of the switch and inductor circuits 2A, 2B and the output 14, 15, and a second one 3B of the rectifier circuits 3A, 3B is connected between a second one 2B of the switch and inductor circuits 2A, 2B and the output 14, 15. In this example, each of the switch and inductor circuits 2A, 2B includes one further circuit node 23A, 23B and the corresponding rectifier circuit 3A, 3B is connected between this further circuit node 23A, 23B and the output 14, 15. This, however, is only an example. According to another example explained herein further below, each of the switch and inductor circuits 2A, 2B includes two further circuit nodes and the corresponding rectifier circuit is connected between the two further circuit nodes and the output 14, 15. Referring to FIG. 1, the output includes a first output node 14 and a second output node 15.

According to one example (and as shown in FIG. 1), each of the rectifier circuits 3A, 3B is connected between the respective one of the switch and inductor circuits 2A, 2B and each of these first and second output nodes 14, 15. Further, the first capacitor network 4 is connected between the input nodes 1A, 1B and each of these first and second output nodes 14, 15. The second capacitor network 7 is connected between the first output node 14 and the second output node 15.

In the example shown in FIG. 1, the second circuit nodes 22A, 22B of the plurality of switch and inductor circuits 2A, 2B are connected to distinct input nodes, and the first capacitor network 4 is connected to each of the input nodes 1A, 1B. This, however, is only an example. According to another example explained herein below, the second circuit nodes of the switch and inductor circuits are connected to the same input node and the first capacitor network 4 is connected to only one input node.

In the power converter circuit shown in FIG. 1, the plurality of switch and inductor circuits includes two switch and inductor circuits 2A, 2B and the plurality of rectifier circuits includes two rectifier circuits 3A, 3B. This, however, is only an example. The power converter circuit may be implemented with more than two switch and inductor circuits and more than two rectifier circuits, such as three switch and inductor circuits and three rectifier circuits, as well.

A power converter circuit with a topology of the type shown in FIG. 1 can be operated as an AC-DC converter that receives alternating input voltages $Vin1_1$, $Vin2_1$ (that may be generated by the same voltage source 51) and provides a direct output voltage Vout. A voltage level of the output voltage Vout can be regulated such that it is higher than twice the amplitude of the alternating input voltages, that is, the output voltage Vout can be higher than $2 \cdot v_o$. However, due to the first capacitor network 4 voltage levels of the output voltages Vout lower than twice the amplitude of the input voltages $Vin1_1$, $Vin2_1$ are possible. Dependent on the specific implementation of the power converter circuit and the first capacitor network 4, output voltage levels of the output voltage Vout as low as the amplitude of the input voltages $Vin1_1$, $Vin2_1$ are possible. This is explained in further detail herein below.

FIG. 4 shows one example of the first capacitor network 4 that may be implemented in the power converter circuit of the type shown in FIG. 1. In this example, the first capacitor network 4 includes a plurality of capacitor half-bridges 4A, 4B. Each of these plurality of half-bridges 4A, 4B is connected between a respective one of the input nodes 1A, 1B and each of the output nodes 14, 15. In the example shown in FIG. 4, in which the first capacitor network 4 is connected to two input nodes 1A, 1B, the first capacitor network 4 includes a first capacitor half-bridge 4A connected between the first input node 1A and the output 14, 15 and a second capacitor half-bridge 4B connected between the second input node 1B and the output 14, 15. Each of the capacitor half-bridges 4A, 4B includes a series circuit with a first capacitor 41A, 41B and a second capacitor 42A, 42B, wherein these series circuits are connected between the first output node 14 and the second output node 15. Further, each of the capacitor half-bridges 4A, 4B includes a tap, which is a circuit node between the two capacitors 41A, 42A and 41B, 42B that form the respective half-bridge 4A, 4B. The tap of each capacitor half-bridge 4A, 4B is connected to the respective input node 1A, 1B. That is, the tap of the first half-bridge is connected to the first input node 1A and the tap of the second half-bridge is connected to the second input node 1B. Thus, a voltage between the taps is given by the input voltage $Vin1_1$.

FIG. 5 shows one example of the second capacitor network 7. In this example, the second capacitor network 7 includes one capacitor 71, connected between the first output node 14 and the second output node 15.

Figure 31:
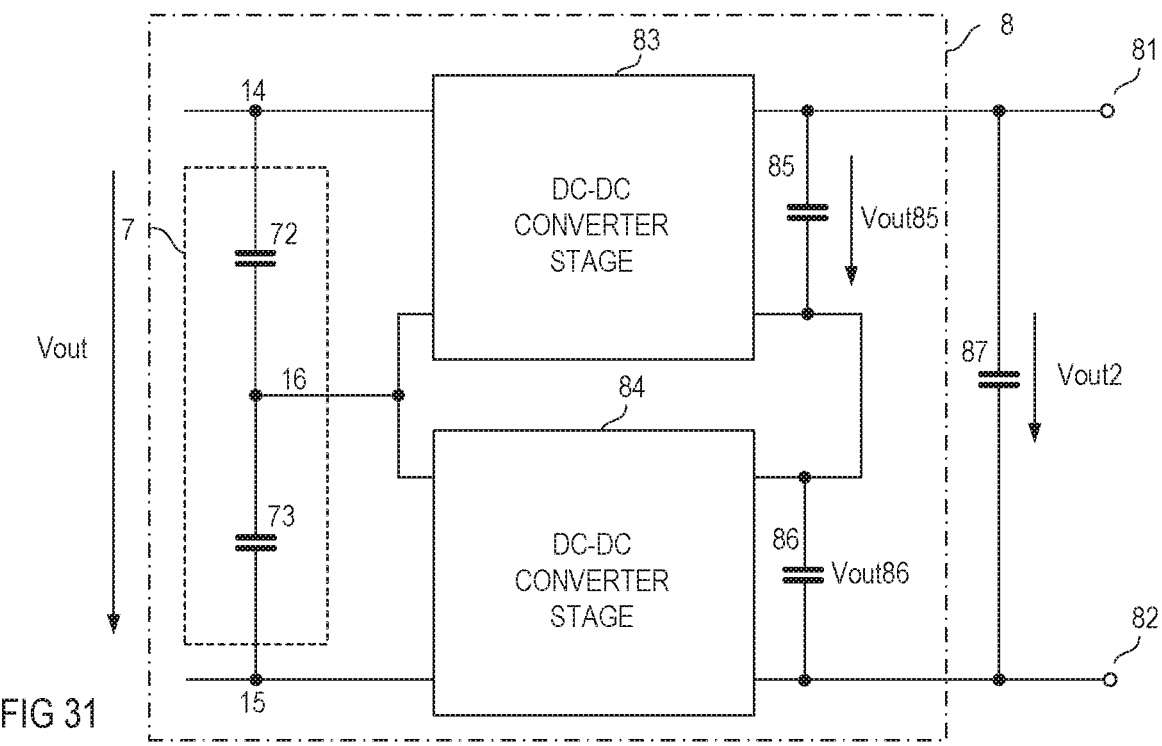
FIG. 31 shows another example of another power converter circuit that may be connected to an output of the power converter circuit.

Another example of the second capacitor network 7 is shown in FIG. 6. In this example, the second capacitor network 7 includes a first capacitor 72 and a second capacitor 73, wherein these capacitors 72, 73 are connected in series between the first output node 14 and the second output node 15. A tap, which is a circuit node between the first capacitor 72 and the second capacitor 73, may form a third output 16 of the power converter circuit in this example. One example of how this third output may be used is illustrated in FIG. 31 and explained further below.

Referring to the above, a capacitance of the at least one capacitor in the second capacitor network 7 is greater than a capacitance of each of at least two capacitors in the first capacitor network 4. In a power converter circuit implemented with a first capacitor network 4 of the type shown in FIG. 4 and a second capacitor network 7 of the type shown in FIG. 5, this includes that the capacitance of the capacitor 71 in the second capacitor network 7 is greater than the capacitance of each of the capacitors 41A-42B of the capacitor half-bridges 4A, 4B in the first capacitor network. In a power converter circuit implemented with a first capacitor network 4 of the type shown in FIG. 4 and a second capacitor network 7 of the type shown in FIG. 6, this includes that a capacitance of each of the first and second capacitors 72, 73 in the second capacitor network 7 is greater than a capacitance of each of the capacitors 41A-42B of the capacitor half-bridges 4A, 4B.

According to one example, the capacitances of the capacitors 41A-42B of the capacitor half-bridges 4A, 4B in the first capacitor network 4 are essentially the same, that is, C41A≈C42A≈C41B≈C42B, where C41A, C42A, C41B, C42B are the capacitances of the capacitors 41A, 41B, 42A, 42B of the capacitor half-bridges 4A, 4B. Further, according to one example, capacitances C72, C73 of the first and second capacitor 72, 73 of the second capacitor network 7 are essentially the same (C72≈C73).

Figure 7:
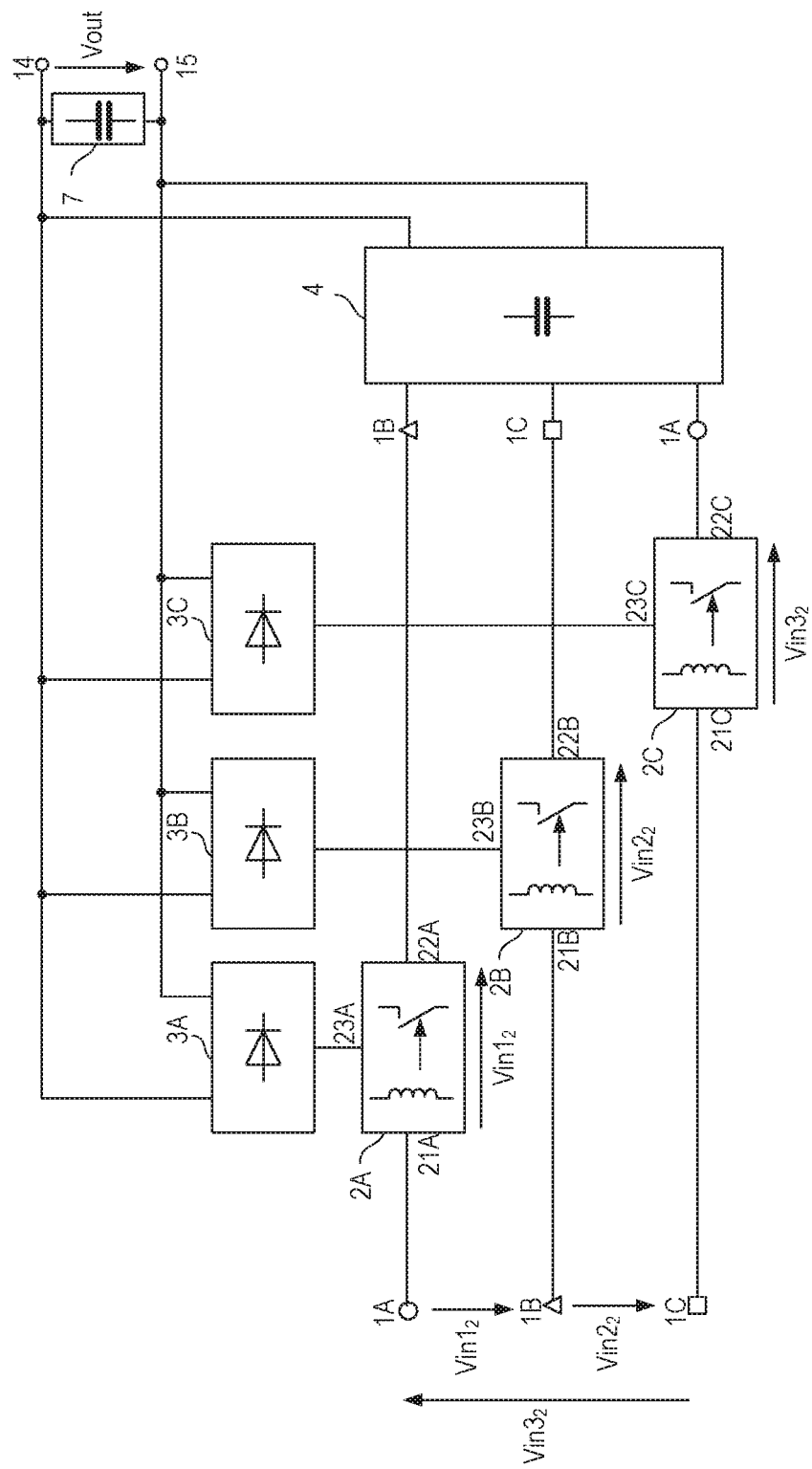
FIG. 7 shows a circuit diagram that illustrates another example of a power converter circuit including a plurality of switch inductor circuits, a plurality of rectifier circuits, a first capacitor network and a second capacitor network.

FIG. 7 shows a circuit diagram of a power converter circuit according to another example. This power converter circuit is based on the power converter circuit shown in FIG. 1 and additionally includes: a third input node 1C; a third switch and inductor circuit 2C with a first circuit node 21C, a second circuit node 22C, and a further circuit node 23C; and a third rectifier circuit 3C connected between the third switch and inductor circuit 2C and the output 14, 15. In the power converter circuit shown in FIG. 7, each of the switch and inductor circuits 2A-2C is connected between a respective pair of the input nodes 1A-1C and each of the rectifier circuits 3A-3C is connected between a respective one of the switch and inductor circuits 2A-2C and the output 14, 15. The first circuit nodes 21A-21C of the switch and inductor circuits 2A-2C are connected to distinct input nodes 1A-1C, and the second circuit nodes 22A-22C of the switch and inductor circuits 2A-2C are connected to distinct input nodes 1A-1C. More specifically, in the example shown in FIG. 7: the first switch and inductor circuit 2A is connected between the first input node 1A and the second input node 1B; the second switch and inductor circuit 2B is connected between the second input node 1B and the third input node 1C; and the third switch and inductor circuit 2C is connected between the third input node 1C and the first input node 1A.

The input nodes 1A-1C are configured to receive three different input voltages $Vin1_2$, $Vin2_2$, $Vin3_2$ in this example. A first input voltage $Vin1_2$ is received between the first input node 1A and the second input node 1B, a second input voltage $Vin2_2$ is received between the second input 1B and the third input node 1C, and a third input voltage $Vin3_2$ is received between the second input node 1C and the first input node 1A. In this example, a voltage received between the first circuit node 21A and the second circuit node 22A of the first switch and inductor circuit 2A equals the first input voltage $Vin1_2$, a voltage received between the first circuit node 21B and the second circuit node 22B of the second switch and inductor circuit 2B equals the second input voltage $Vin2_2$, and a voltage received between the first circuit node 21C and the second circuit node 22C of the third switch and inductor circuit 2C equals the third input voltage $Vin3_2$.

Figure 8:
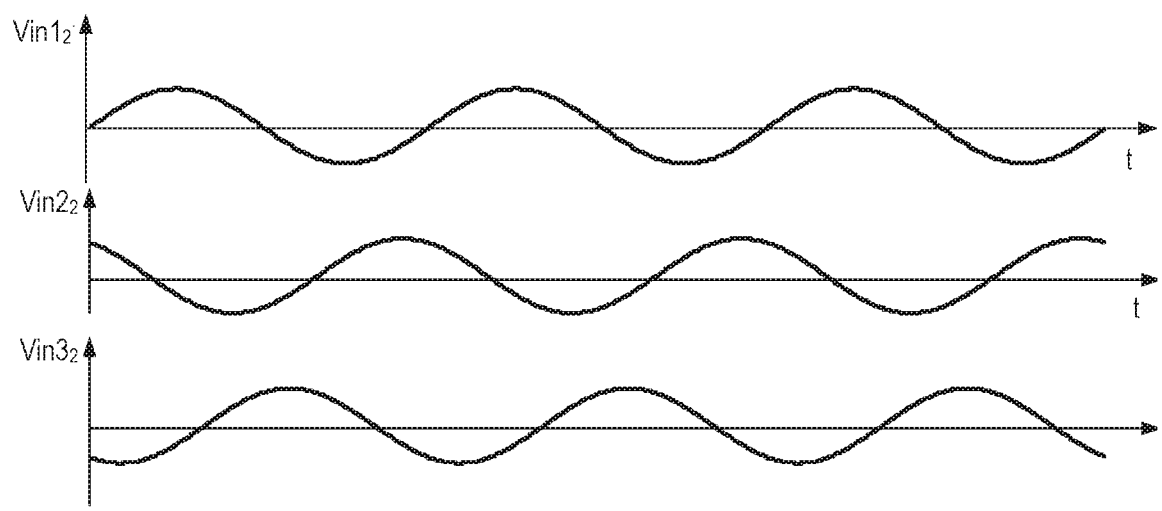
FIG. 8 shows timing diagrams that illustrate examples of supply voltages that may be received by a power converter circuit of the type shown in FIG. 7.

According to one example, the input voltages $Vin1_2$-$Vin3_2$ received between respective pairs of the input nodes 1A-1C are alternating voltages having a phase shift of 120° relative to each other. According to one example, these alternating voltages are sinusoidal voltages. Timing diagrams of examples of sinusoidal input voltages $Vin1_2$-$Vin3_2$ having a phase shift of 120° relative to each other are illustrated in FIG. 8.

Figure 9:
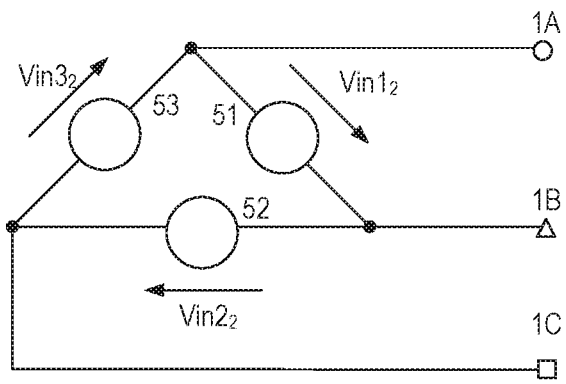
FIGS. 9 and 10 show different examples of a power source arrangement configured to provide supply voltages to a power converter circuit of the type shown in FIG. 7.

FIG. 9 shows one example of a voltage source arrangement that is configured to provide the three input voltages $Vin1_2$, $Vin2_2$, $Vin3_2$ illustrated in FIG. 7. In this example, the voltage source arrangement includes three voltage sources 51, 52, 53, wherein each of these voltage sources 51, 52, 53 is connected between a respective pair of the input nodes 1A-1C. More specifically, a first voltage source 51 is connected between the first input node 1A and the second input node 1B, a second voltage source 52 is connected the second input node 1B and the third input node 1C, and a third voltage source 53 is connected between the third input node 1C and the first input node 1A. Each of these voltage sources 51-53 is an alternating voltage source providing an alternating voltage, such as a sinusoidal voltage, according to one example. A voltage source arrangement of the type shown in FIG. 9 is referred to as voltage source arrangement with a delta (Δ) configuration in the following.

Figure 10:
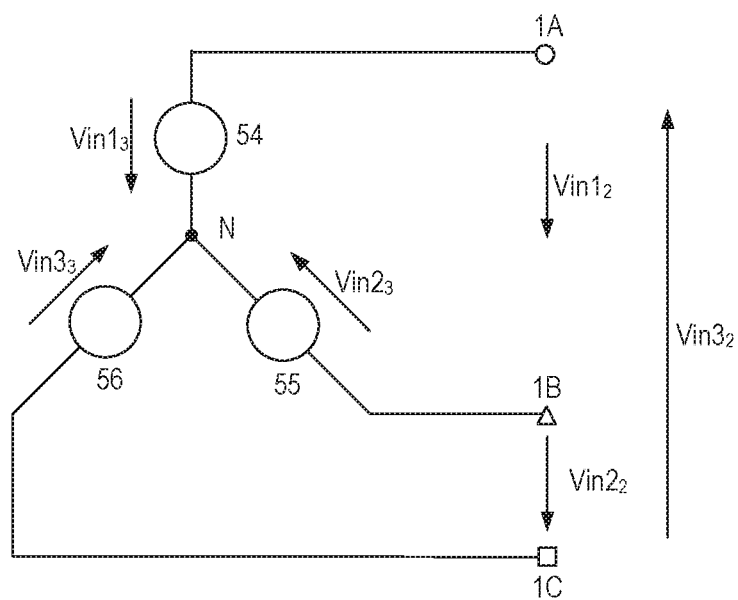

FIG. 10 shows another example of a voltage source arrangement configured to provide the three input voltages $Vin1_2$-$Vin3_2$. This voltage source arrangement includes three voltage sources 54-56, wherein each of these voltage sources 54-56 is connected between a respective one of the input nodes 1A-1C and a circuit node N common to the voltage sources 54-56. Each of these voltage sources 54-56 is configured to provide a supply voltage $Vin13$, $Vin23$, $Vin33$ between the respective input node 1A-1C and the common circuit node N. In this example, each of the three input voltages $Vin1_2$-$Vin3_2$ received at the input nodes 1A-1C is given by a difference between two of the supply voltages voltage $Vin13$, $Vin23$, $Vin33$. More specifically, $$Vin1_2 = Vin1_3 \cdot Vin2_3 \qquad (2a)$$

$$Vin2_2 = Vin2_3 \cdot Vin3_3 \qquad (2b)$$

$$Vin3_2 = Vin3_3 \cdot Vin1_3 \qquad (2c)$$

According to one example, the three supply voltages $Vin1_3$-$Vin3_3$ are sinusoidal voltages that have the same amplitude and that have a phase shift 120° relative to each other. It can be shown that in this case the input voltages $Vin1_2$-$Vin3_2$ are also sinusoidal voltages having a phase shift of 120° relative to each other and an amplitude that is $\sqrt{3}$ the amplitude of the supply voltages $Vin1_3$, $Vin2_3$, $Vin3_3$.

Figure 11:
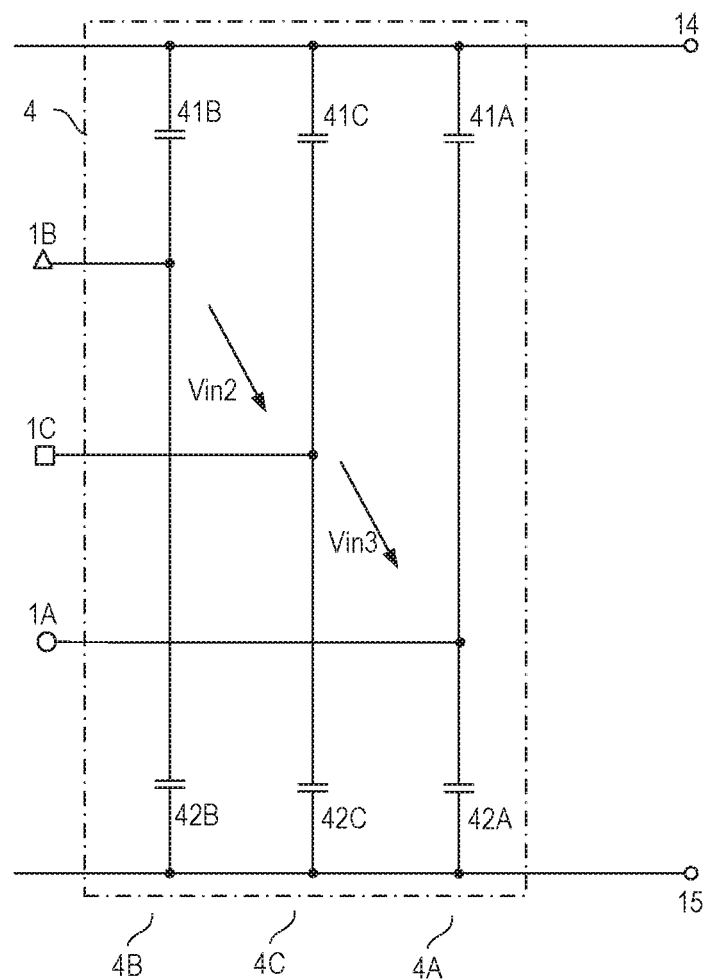
FIG. 11 shows another example of the first capacitor network.

FIG. 11 shows one example of the first capacitor network 4 in the power converter circuit shown in FIG. 7. This first capacitor network 4 is based on the first capacitor network 4 shown in FIG. 4 and additionally includes a third capacitor half-bridge 4C connected between the third input node 1C and the output 14, 15. The third capacitor half-bridge 4C includes a first capacitor 41C and a second capacitor 42C connected in series between the first output node 14 and the second output node 15. A tap of the third capacitor half-bridge 4C, which is a circuit node between the first capacitor 41C and the second capacitor 42C, is connected to the third input node 1C. In accordance with what is explained above, a capacitance of each of the capacitors 41C, 42C of the third capacitor half-bridge 4C is lower than a capacitance of the at least one capacitor (71 in FIG. 5 or 72, 73 in FIG. 6) of the second capacitor network 7. Everything that is outlined above with regard to the relationship between the capacitances of the capacitors of the first and second capacitor half-bridges 4A, 4B and the capacitance of the at least one capacitor of the second capacitor network 7 and with regard to the values of the capacitances of the capacitors of the first and second capacitor half-bridges 4A, 4B applies to the capacitances of the capacitors in the first, second and third capacitor half-bridges shown in FIG. 11 as well. According to one example, capacitances C41A, C42A, C41B, C42B, C41C, C42C of the capacitors 41A, 42A, 41B, 42B, 41C, 42C of the first capacitor network 4 are essentially equal and smaller than 10 microfarads (μf), smaller than 1 microfarad (μf), smaller than 100 nanofarads (nF), or even smaller than 1 nanofarad (nF).

Figure 12:
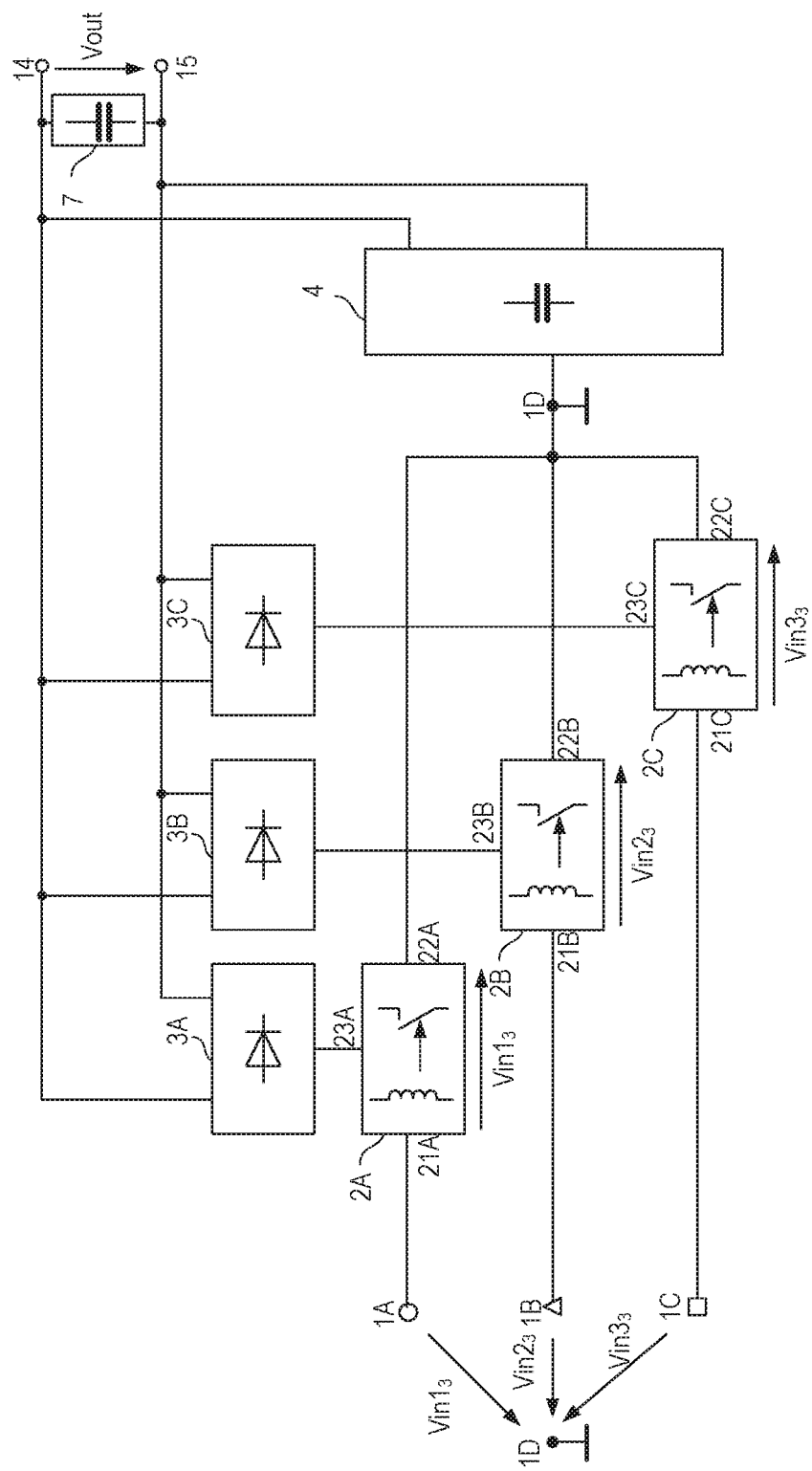
FIG. 12 shows a circuit diagram that illustrates another example of a power converter circuit including a plurality of switch inductor circuits, a plurality of rectifier circuits, a first capacitor network and a second capacitor network.

FIG. 12 shows a modification of the power converter circuit shown in FIG. 7. The power converter circuit shown in FIG. 12 is different from the power converter circuit shown in FIG. 7 in that it additionally includes a fourth input node 1D. Each of the switch and inductor circuits 2A-2C is connected between a respective pair of the input nodes 1A-1D in such a way that the first circuit nodes 21A-21C of the switch and inductor circuits 2A-2C are connected to distinct input nodes 1A-1C and the second circuit nodes 21A-21C of the switch and inductor circuits 2A-2C are each connected to the fourth input node 1D. Further, the first capacitor network 4 is connected between the fourth input node 1D and the output 14, 15.

The power converter circuit shown in FIG. 12 is configured to receive a first input voltage $Vin1_3$ between the first input node 1A and the fourth input node 1D, a second input voltage $Vin23$ between the second input node 1B and the fourth input node 1D, and a third input voltage $Vin3_3$ between the third input node 1C and the fourth input node 1D. Thus, the first switch and inductor circuit 2A receives the first input voltage $Vin1_3$ between the first circuit node 21A and the second circuit node 22A, the second switch and inductor circuit 2B receives the second input voltage $Vin23$ between the first circuit node 21B and the second circuit node 22B, and the third switch and inductor circuit 2C receives the third input voltage $Vin3_3$ between the first circuit node 21C and the second circuit node 22C.

Figure 13:
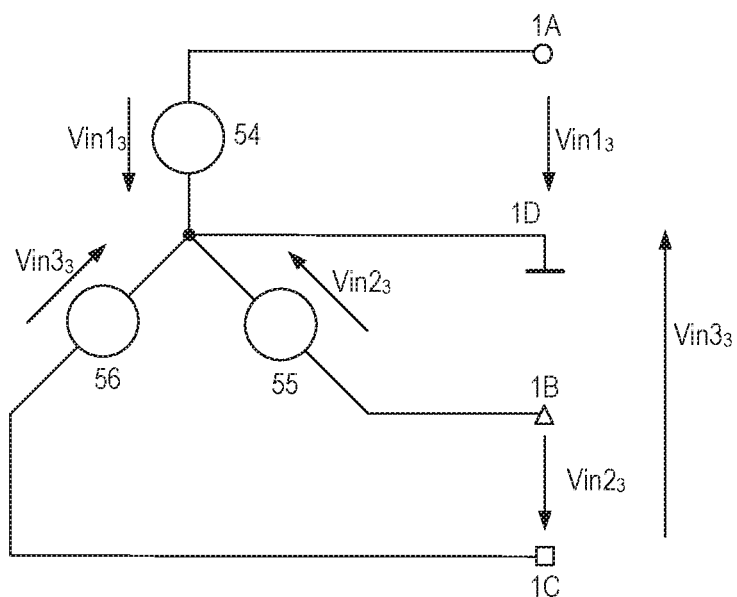
FIG. 13 shows one example of a power source arrangement configured to provide a supply voltage to a power converter circuit of the type shown in FIG. 13.

FIG. 13 shows one example of a voltage source arrangement that is configured to generate the input voltages received by a power converter circuit of the type shown in FIG. 12. The voltage source arrangement shown in FIG. 13 is based on the voltage source arrangement shown in FIG.

10, wherein the common circuit node N is connected to the fourth input node 1D. In this example, the first input voltage Vin1$_3$ equals the supply voltage provided by the first voltage source 53, the second input voltage Vin2$_3$ equals the supply voltage provided by the second voltage source 54, and the third input voltage Vin3$_3$ equals the supply voltage provided by the third voltage source 56. According to one example, the three supply/input voltages Vin1$_3$-Vin3$_3$ are sinusoidal voltages that have the same amplitude and that have a phase shift 120° relative to each other.

Figure 14:
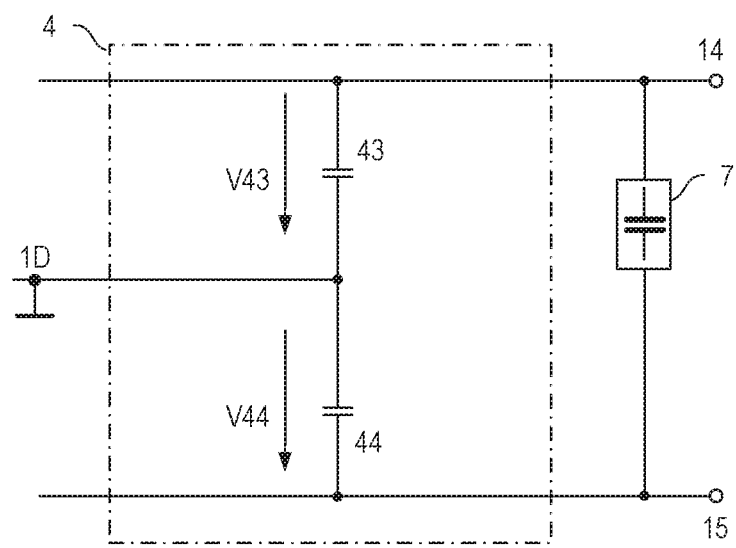
FIG. 14 shows another example of the first capacitor network.

FIG. 14 shows one example of the first capacitor network 4 in the power converter circuit shown in FIG. 12. In this example, the first capacitor network 4 includes one capacitor half-bridge with a first capacitor 43 and a second capacitor 44 connected in series between the first output node 14 and the second output node 15. A tap, which is a circuit node between the first capacitor 43 and the second capacitor 44, is connected to the fourth input node 1D. A capacitance of each of these first and second capacitors 43, 44 is smaller than the capacitance of the at least one capacitor (71 in FIGS. 5 and 72, 73 in FIG. 6) included in the at least one second capacitor network 7 in the same way explained with other examples of the first capacitor network explained herein above. Further, a capacitance of each of the capacitors 43, 44 in the first capacitor network 4 is smaller than 10 microfarads (μg), smaller than 1 microfarad (μf), smaller than 100 nanofarads (nF), or even smaller than 1 nanofarad (nF).

Figure 15:
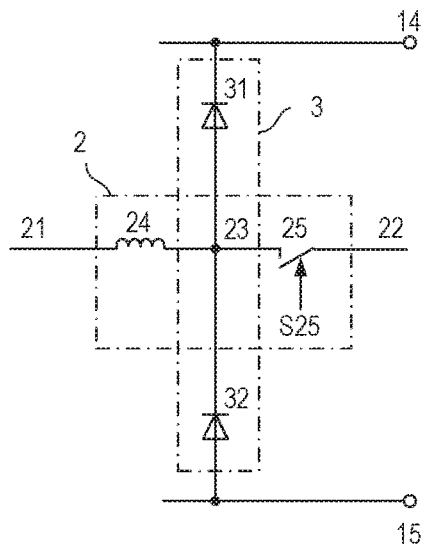
FIG. 15 shows one example of the switch and inductor circuit.
Figure 17:
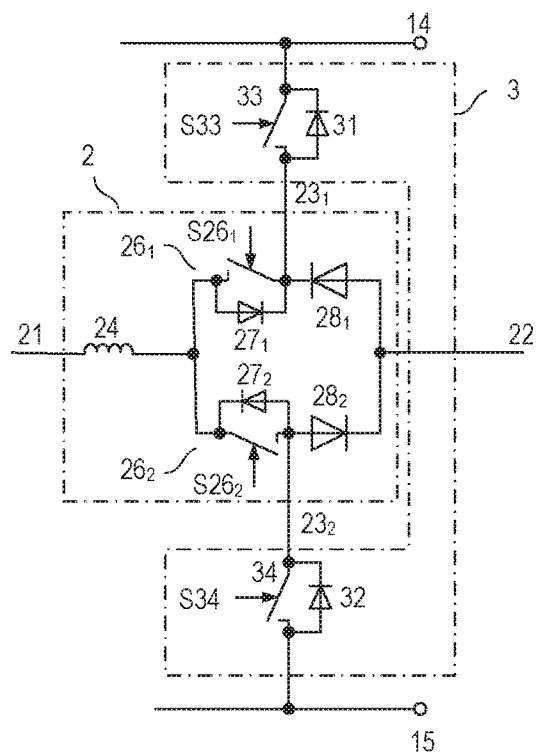
FIGS. 17 and 18 show further examples of the switch and inductor circuit.
Figure 18:
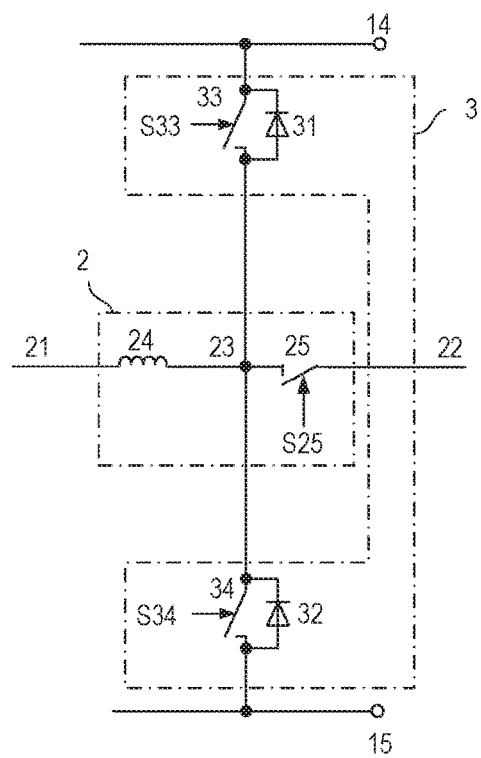

In the power converter circuits explained before, the switch and inductor circuits 2A-2C and the rectifier circuits 3A-3C are only schematically illustrated. A circuit with one switch and inductor circuit and one rectifier circuit connected to the switch and inductor circuit is also referred to as one converter stage in the following. These switch and inductor circuits 2A-2C and rectifier circuits 3A-3C (converter stages) may be implemented in various ways. Examples of how these switch and inductor circuits 2A-2C and rectifier circuits 3A-3C may be implemented are illustrated in FIGS. 15, 17 and 18. In each of these figures reference number 2 denotes an arbitrary one of the plurality of switch and inductor circuits implemented in one power converter circuit and reference number 3 denotes an arbitrary one of the plurality of the rectifier circuits implemented in one power converter circuit. In the examples illustrated in FIGS. 15, 17 and 18, the switch and inductor circuit 2 includes one inductor 24 and at least one electronic switch 25, 261, 262. Further, in each of these examples, the rectifier circuit 3 includes at least two rectifier elements 31, 32.

In the example shown in FIG. 15, the switch and inductor circuit 2 includes a series circuit with the inductor 24 and one electronic switch 25, wherein the series circuits is connected between the first circuit node 21 and the second circuit node 22. A circuit node between the inductor 25 and the electronic switch 25 forms the further circuit node 23 in this example, wherein the inductor 24 is connected between the first circuit node 21 and the further circuit node 23 and the electronic switch 25 is connected between the further circuit node 23 and the second circuit node 22.

The rectifier circuit 3 shown in FIG. 15 includes a first rectifier element 31 connected between the further circuit node 23 and the first output node 14 and a second rectifier element 32 connected between the second circuit node 23 and the second output node 15. Just for the purpose of illustration, the rectifier elements 31, 32 are drawn as bipolar diodes in the example shown in FIG. 15. However, any other type of passive or active rectifier element may be used as well.

Figure 16:
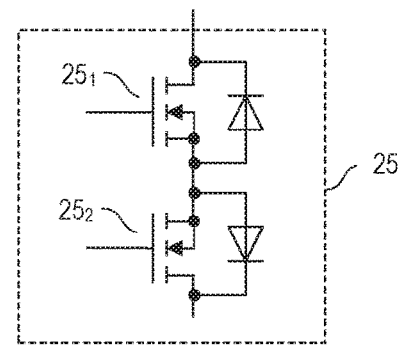
FIG. 16 shows one example of a bidirectionally blocking electronic switch.

According to one example, the electronic switch 25 is a bidirectionally blocking electronic switch. One example of how a bidirectionally blocking electronic switch 25 can be implemented is shown in FIG. 16. In this example, the electronic switch 25 includes two MOSFETs each having an integrated body diode, which is represented by a diode symbol in FIG. 16. The two MOSFETs have their drain-source paths connected in series such that the body diodes are connected in a back-to-back configuration. Implementing a bidirectionally blocking switch using two MOSFETs, however, is only an example. Any other type of bidirectionally blocking electronic switch may be used as well in the switch and inductor circuit 2 shown in FIG. 15.

FIG. 17 shows a switch and inductor circuit 2 according to another example. This switch and inductor circuit 2 includes two further circuit nodes 23$_1$, 23$_2$, which are referred to as first further circuit node 23$_1$ and second further circuit node 23$_2$ in the following. Further, the switch and inductor circuit 2 includes two electronic switches, a first electronic switch 261 connected between the inductor 24 and the first further circuit node 23$_1$, and a second electronic switch 26$_2$ connected between the inductor 24 and the second further circuit node 23$_2$. A first rectifier element 281 is connected between the second circuit node 22 and the first further circuit node 23$_1$, and a second rectifier element 28$_2$ is connected between the second circuit node 22 and the second further circuit node 23$_2$. Further, a third rectifier element 271 is connected in parallel with the first electronic switch 26$_1$, and a fourth rectifier element 27$_2$ is connected in parallel with the second electronic switch 26$_2$. The first rectifier element 28$_1$ and the third rectifier element 27$_1$ are connected in a back-to-back (face-to-face) configuration and the second rectifier element 28$_1$ and the first fourth rectifier element 27$_2$ are connected in a back-to-back configuration. The first electronic switch 26$_1$ and the third rectifier element 27$_1$ may be implemented using a MOSFET, wherein the third rectifier element 27$_1$ may be implemented by the integrated body diode of the MOSFET in this example. Equivalently, the second electronic switch 26$_2$ and the fourth rectifier element 27$_2$ may be implemented using a further MOSFET, wherein the fourth rectifier element 27$_2$ may formed by the integrated body diode of this further MOSFET.

In the rectifier circuit 3 shown in FIG. 17, a first rectifier element 31 is connected between the first further circuit node 23$_1$ and the first output node 14, and a second rectifier element 32 is connected between the second further circuit node 23$_2$ and the second output node 15. Further, in this rectifier circuit 3, a first electronic switch 33 is connected in parallel with the first rectifier element 31 and a second electronic switch 34 is connected in parallel with the second rectifier element 32.

FIG. 18 shows a converter stage with a switch and inductor circuit 2 and a rectifier circuit 3 according to another example. In this example, the switch and inductor circuit 2 is implemented as explained with reference to FIG. 15 and includes one inductor 24 and one electronic switch 25. The rectifier circuit 3 is implemented as explained with reference to FIG. 17 and includes a first rectifier element 31 connected in parallel with a first electronic switch 33 and a second rectifier element 32 connected in parallel with a second electronic switch 34, wherein the first rectifier element 31 and the first electronic switch 33 are connected between the third circuit node 23 of the switch and inductor circuit and the first output node 14 and the second rectifier element 32 and the second electronic switch 34 are connected between the third circuit node 23 and the second output node 15. In this topology, conduction losses in the rectifier circuit 3 can be reduced when switching on the electronic switches 33, 34 when the parallel rectifier element is forward biased.

Figure 19:
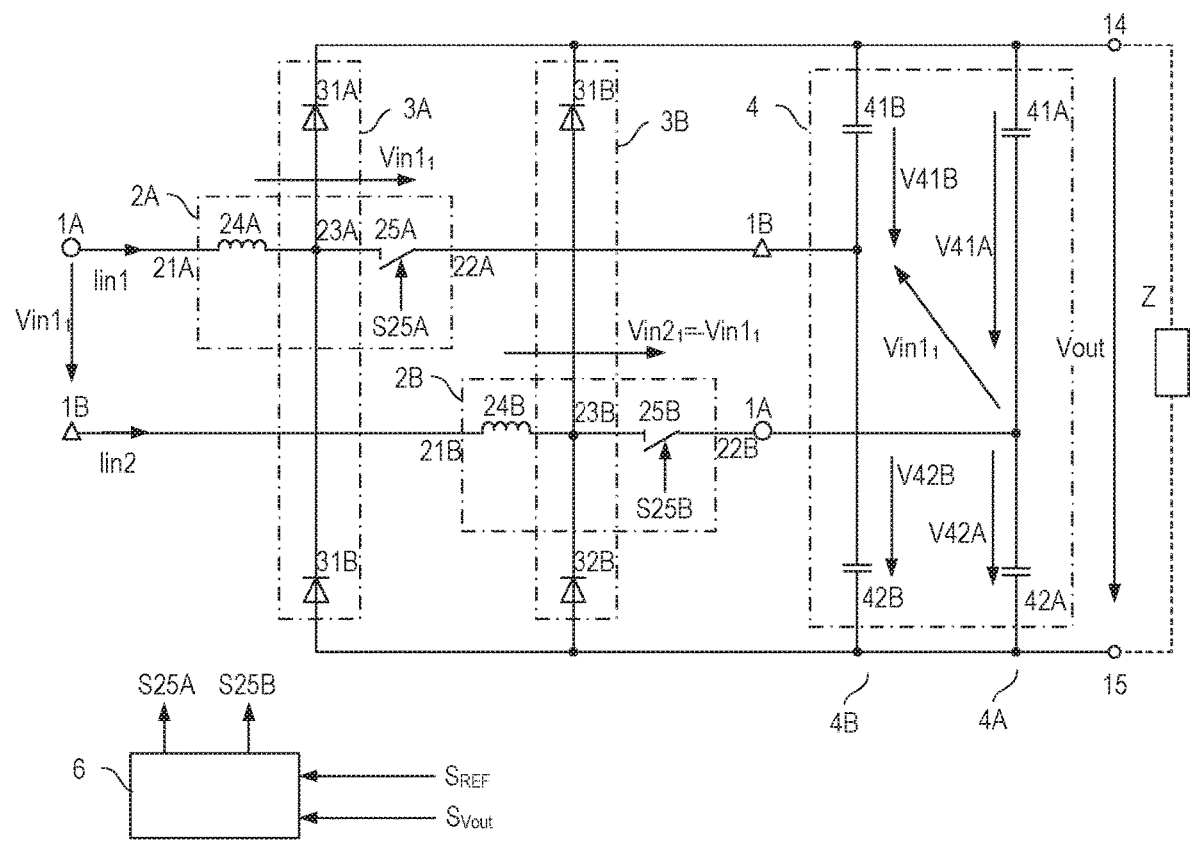
FIG. 19 shows one example of a power converter circuit of the type shown in FIG. 1 implemented with switch and inductor circuits of the type shown in FIG. 15.

FIG. 19 shows one example of a power converter circuit of the type explained with reference to FIG. 1 that includes switch and inductor circuits 2A, 2B and rectifier circuits 3A, 3B with a topology as explained with reference to FIG. 15. In FIG. 19, circuit nodes and elements of the switch and inductor circuits 2A, 2B and the rectifier circuits 3A, 3B have the same reference numbers as used in FIG. 15 supplemented by an "A" in the first switch and inductor circuit 2A and the first rectifier circuit 3A and supplemented by a "B" in the second switch and inductor circuit 2B and the second rectifier circuit 3B. Further, in the power converter circuit shown in FIG. 19, the first capacitor network 4 has a topology as explained with reference to FIG. 4. Referring to FIG. 19, the power converter circuit further includes a controller 6 (not shown in the examples explained before) that is configured to generate drive signals as S25A, S25B received by the electronic switches 25A, 25B in the switch and inductor circuits 2A, 2B. According to one example, this controller 6 receives an output voltage signal $Sv_{out}$ representing the output voltage Vout and a reference signal $S_{REF}$. According to one example, the reference signal $S_{REF}$ represents a setpoint level of the output voltage Vout and the controller 6 is configured to generate the drive signals S25A, S25B such that the output voltage Vout is regulated in such a manner that its voltage level essentially equals a voltage level represented by the reference signal $S_{REF}$. The output voltage signal $Sv_{out}$ can be obtained from the output voltage Vout using any kind of voltage measurement circuit (not shown in FIG. 19). Such voltage measurement circuits are commonly known so that no further explanations are required in this regard.

Figure 20:
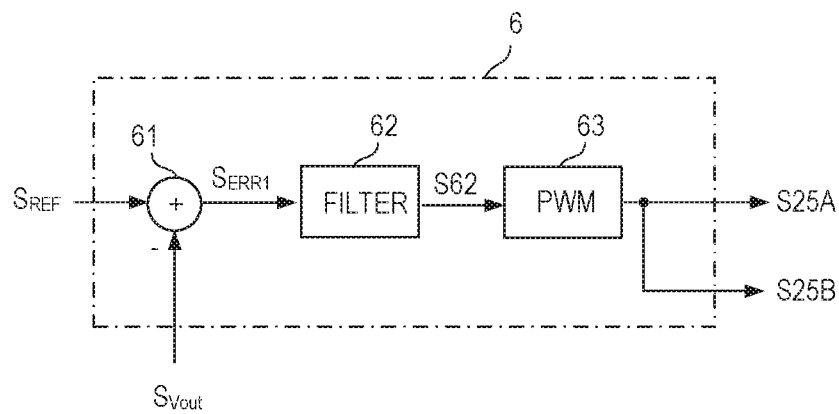
FIG. 20 shows one example of a controller implemented in the power converter circuit shown in FIG. 19.

One example of a controller 6 configured to generate the drive signals S25A, S25B received by the electronic switches 25A, 25B in the switch and inductor circuits 2A, 2B is illustrated in FIG. 20. In this example, the controller 6 calculates a first error signal $S_{ERR1}$ based on the reference signal $S_{REF}$ and the output voltage signal $S_{Vout}$. Calculating the first error signal $S_{ERR1}$ may include subtracting the output voltage signal $Sv_{out}$ from the reference signal $S_{REF}$ by a subtractor 61. A filter 62 receives the first error signal $S_{ERR1}$ and provides a filtered error signal S62 to a PWM circuit 63. The PWM circuit 63 is configured to generate PWM drive signals S25A, S25B based on the filtered error signal S62. The filter 62 may have any one of a proportional (P) characteristic, a proportional-integrative (PI) characteristic, a proportional-integrative-derivative (PID) characteristic, or a similar characteristic.

In the example shown in FIG. 20, the controller 6 generates one drive signal S25 that is used to drive both the electronic switch 25A in the first switch and inductor circuit 2A and the electronic switch 25B in the second switch and inductor circuit 2B. That is, the drive signals S25A, S25B are formed by one and the same drive signal S25 in this example. This, however, is only an example. According to another example, the switches 25A, 25B are operated in an interleaved fashion. For example, this may be achieved by driving one of the switches 25A, 25B based on the drive signal S25 provided by the PWM circuit 63 and by driving the other one of the switches 25A, 25B based on a signal that is obtained by delaying the drive signal S25 provided by the PWM circuit 63.

Figure 21:
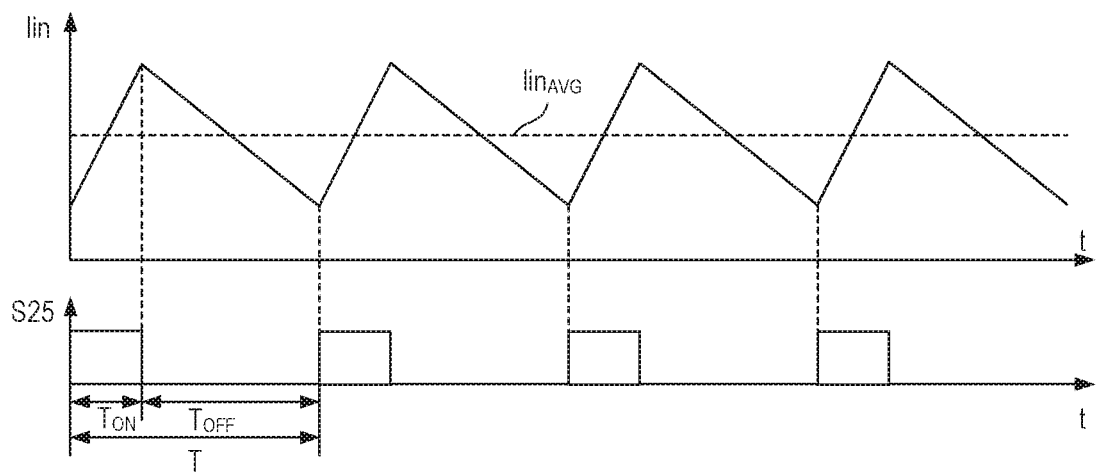
FIG. 21 shows signal diagrams of an input current and control signals in a power converter circuit of the type shown in FIG. 19.

The function of the PWM circuit 63 is illustrated in FIG. 21 that shows one example of a signal diagram of the drive signal S25 generated by the PWM circuit 63. Referring to FIG. 21, the drive signal includes a plurality of drive cycles of a duration T, wherein in each of these drive cycles the drive signal S25 has an on-level for an on-period $T_{ON}$ and an off-level for an off-period $T_{OFF}$. The on-level switches on the respective switch 25A, 25B and the off-level switches off the respective switch 25A, 25B. Just for the purpose of illustration, the on-level is drawn as a high signal level in FIG. 21 and the off-level is drawn as a low signal level in the example shown in FIG. 21.

The power converter circuit shown in FIG. 19 includes two converter stages that are each connected between the input nodes 1A, 1B and the output 14, 15. A first converter stage includes the first switch and inductor circuit 2A and the first rectifier circuit 3A, and a second converter stage includes the second switch and inductor circuit 2B and the second rectifier circuit 3B. Regulating the output voltage Vout by the control circuit 6 in this example includes controlling an input current Iin1, Iin2 received by these converter stages.

FIG. 21 shows the current waveform of the input current of one of these converter stages (wherein Iin represents an arbitrary one of the input currents Iin1, Iin2 shown in FIG. 19) dependent on the drive signal S25 received by the electronic switch (which is referred to as switch 25 in the following) in the switch and inductor circuit of the respective converter stage. Referring to FIG. 21, the input current Iin increases when the drive signal S25 has an on-level and switches on the respective switch 25 and decreases when the drive signal S25 has an off-level and switches of the respective switch. This is explained with reference to the first converter stage 2A, 3A shown in FIG. 19 in the following.

When the drive signal S25A switches on the electronic switch 25A a voltage across the inductor 24A essentially equals the first input voltage $Vin1_1$ so that the input current Iin1 increases. A slope of the increase is essentially given by the instantaneous voltage level of the input voltage $Vin1_1$ divided by an inductance of the inductor 24A ($Iin1=Vin1_1/L$, where L denotes the inductance). When the drive signal S25A switches off the electronic switch 25A the input current Iin1 continues to flow, but is then taken over by one of the rectifier elements 31A, 31B. Which of the two rectifier elements 31A, 31B takes over the input current Iin1 after the electronic switch 25A switches off is dependent on the direction of the input current Iin1, wherein the direction of the input current Iin1 is dependent on a polarity of the input voltage $Vin1_1$. When the input voltage $Vin1_1$ has a polarity as shown in FIG. 19, the input current Iin1 flows in the direction as indicated in FIG. 19. In this case, the first rectifier element 31A takes over the input current Iin1 when the electronic switch 25A switches off. When the input voltage $Vin1_1$ has a polarity opposite the polarity shown in FIG. 19, the input current Iin1 flows in a direction opposite the direction shown in FIG. 19. In this case, the second rectifier element 31B takes over the input current Iin1 when the electronic switch 25A switches off.

The controller shown in FIG. 20 regulates the output voltage Vout by controlling the input currents Iin1, Iin2, wherein controlling the input currents Iin1, Iin2 includes suitably adjusting a duty cycle of the drive signal S25. The "duty cycle" of the drive signal is a ratio between a duration of the on-period $T_{ON}$ and a duration of the drive cycle T, that is, $D=T_{ON}/T$, wherein D denotes the duty cycle. According to one example, the converter stages are operated in a continuous current mode (CCM), which is an operation mode in which the input currents Iin1, Iin2 do not decrease to zero during the off-periods of the individual drive cycles.

The signal waveform of the input current Iin shown in FIG. 21 is the signal waveform of a converter stage operated in the CCM. In FIG. 21, $\text{Iin}_{AVG}$ denotes an average of the input current Iin. This average input current increases when (at a given voltage level of the input voltage) the duty cycle of the drive signal S25 is increased in one or several successive drive cycles and the average input current $\text{Iin}_{AVG}$ decreases when the duty cycle is decreased in one or several successive drive cycles. In the controller illustrated in FIG. 20, the error signal $S_{ERR1}$ and, consequently the filtered error signal S62, indicate changes of the output voltage Vout level relative to the setpoint level represented by the reference signal $S_{REF}$ so that the PWM circuit 63 can suitably adjust the duty cycle in order to regulate the output voltage Vout.

According to one example, the controller 6 is not only configured to regulate a voltage level of the output level Vout, but also regulates the signal waveforms of the input currents Iin1, Iin2 received by the converter stages 2A, 3A and 2B, 3B. According to one example, the signal waveforms of the input currents Iin1, Iin2 are regulated such that they are essentially equal to the signal waveforms of the input voltages $\text{Vin1}_1$, $\text{Vin2}_1$. A power converter circuit with this function can be referred to as power converter circuit with PFC (power factor correction) capability. One example of a controller 6 configured to regulate the voltage level of the output voltage Vout and to regulate the signal waveforms of the input currents Iin1, Iin2 is shown in FIG. 22.

Figure 22:
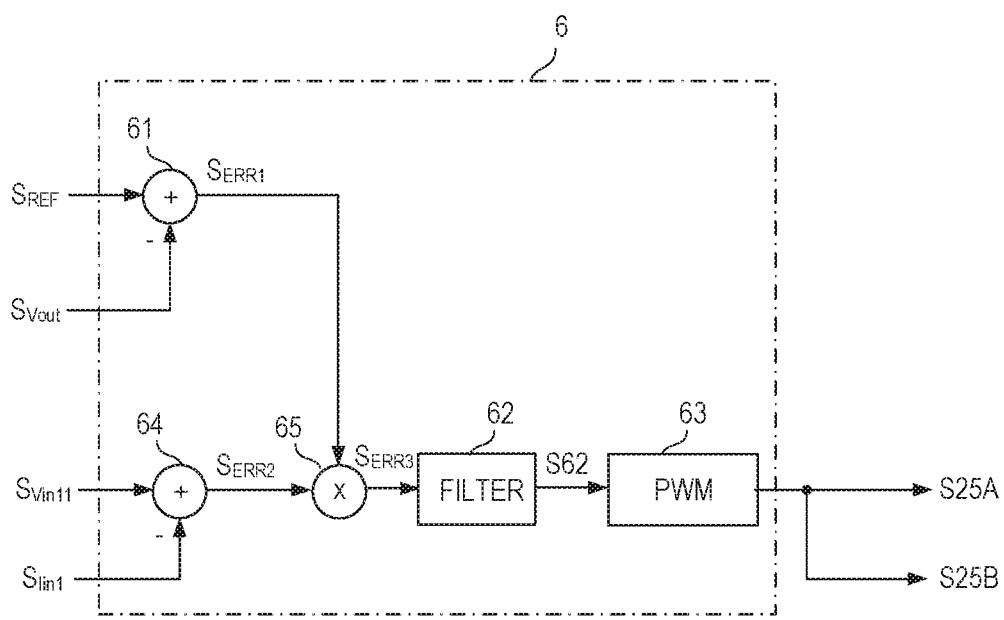
FIG. 22 shows another example of a controller implemented in the power converter circuit shown in FIG. 19.

The controller 6 shown in FIG. 22 is based on the controller shown in FIG. 20 and additionally includes a further subtractor 64 that calculates a second error signal $S_{ERR2}$ based on an input voltage signal $V_{Vin11}$ representing the input voltage $\text{Vin1}_1$ and an input current signal $S_{Iin11}$ representing the input current Iin1. A multiplier 65 receives the first and the second error signals $S_{ERR1}$, $S_{ERR2}$ and calculates a third error signal $S_{ERR3}$ by multiplying the first and the second error signals $S_{ERR1}$, $S_{ERR2}$. The filter 62 receives the third error signal $S_{ERR3}$ and generates the filtered error signal S62 received by the PWM circuit 63 based on the third error signal $S_{ERR3}$.

Referring to the above, in the power converter circuit shown in FIG. 19, each of the input currents Iin1, Iin2 flows through the respective inductor 24A, 24B and the respective electronic switch 25A, 25B when the electronic switch 25A, 25B is closed. When the electronic switch 25A, 25B is open, the input current flows through the inductor 24A, 24B and one of the rectifier elements 31, 31B, 32A, 32B. For example, in the first converter stage 2A, 3A, the input current Iin1 flows through the inductor 24A and the electronic switch 25A when the electronic switch 25A is switched on, wherein a direction of the input current Iin1 is dependent on a polarity of the input voltage $\text{Vin1}_1$. When the electronic switch 25A is switched off, the input current Iin1 continues to flow through the inductor 24A and flows through the first rectifier element 31A when the input voltage $\text{Vin1}_1$ is positive and through the second rectifier element 31B when the input voltage $\text{Vin1}_1$ is negative. At the output, 14, 15, the current received from the rectifier circuits 3A, 3B mainly flows into the second capacitor network 7 and to the load Z that may be connected to the output 14, 15. Into the first capacitor network, only capacitive displacement currents flow when the output voltage Vout and/or the input voltage $\text{Vin1}_1$, $\text{Vin2}_1$ changes. In the example shown in FIG. 19, the first capacitor network 4 is of the type explained with reference to FIG. 4. In this first capacitor network 4 voltages V41A, V41B and V42A, V42B across the first capacitors 41A, 41B and the second capacitors 42A, 42B of the capacitor half-bridges 4A, 4B are given by the following relationships:

$$V41B = V41A + \text{Vin1}_1 \tag{3a}$$

$$V42A = V42B + \text{Vin1}_1 \tag{3b}$$

$$V41A + V42A = V41B + V42B = V\text{out} \tag{3c}$$

Based on these equations it can be seen that the voltages V41A, V42A, V41B, V42B across the capacitors 41A, 42A, 41B, 42B change when one of the input voltage $\text{Vin1}_1$ and the output voltage Vout changes. Such change of a voltage across one of these capacitors 41A, 42A, 41B, 42B is associated with a charging or a discharging of the respective capacitor 41A, 42A, 41B, 42B, wherein charging or discharging is associated with a current flowing into or out from the respective capacitor 41A, 42A, 41B, 42B. Referring to the above, capacitances of the individual capacitors 41A, 42A, 41B, 42B are lower than 10 microfarads (μf) so that losses associated with the first capacitor network 4 are rather low.

Figure 23:
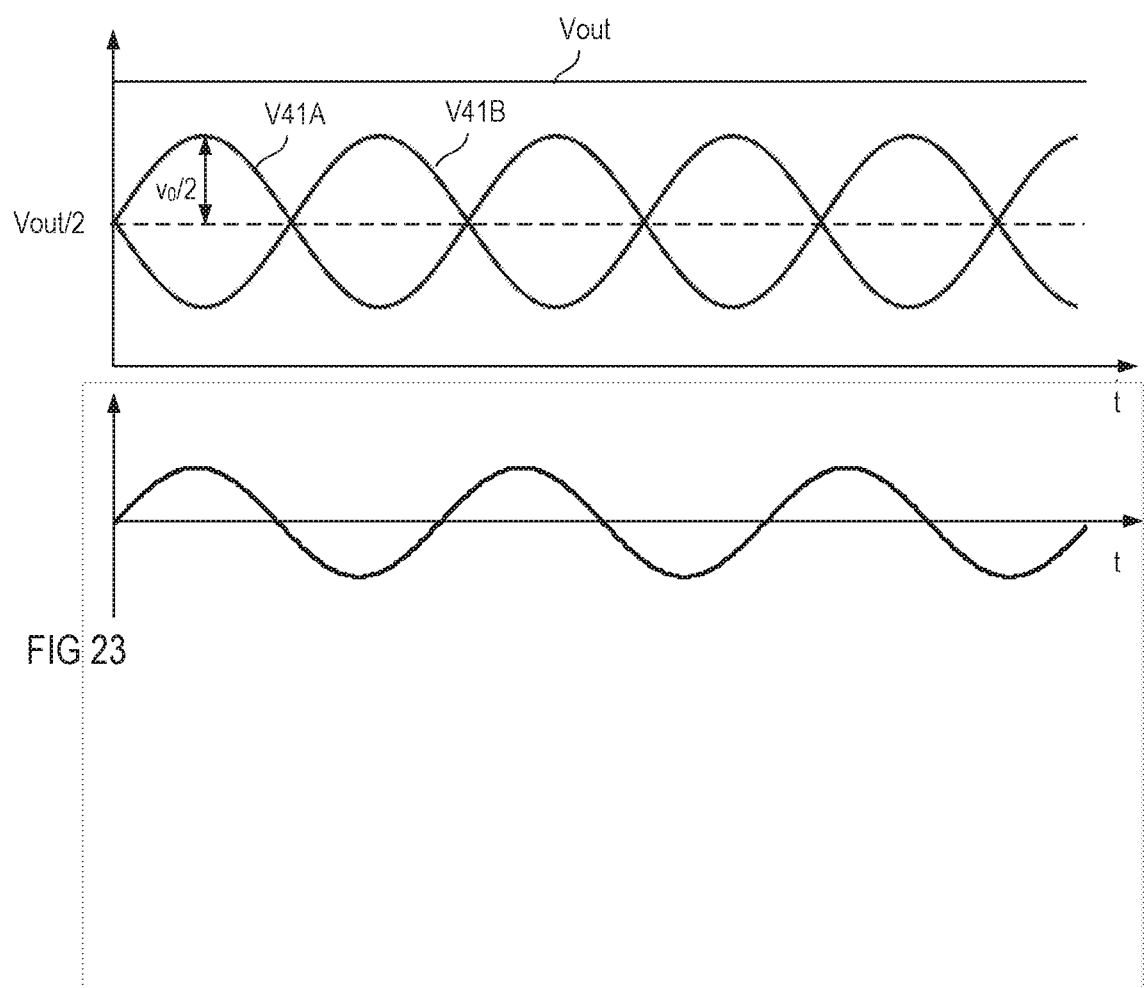
FIG. 23 shows examples of waveforms of an output voltage and of voltages occurring in a capacitor network in a power converter circuit of the type shown in FIG. 19.

It can be assumed that the voltage level of the output voltage Vout changes rather slowly so that voltage changes in the first capacitor network 4 are mainly due to periodic changes of the alternating input voltage $\text{Vin1}_1$. FIG. 23 shows examples of signal waveforms of the output voltage Vout and of the voltages across the capacitors of one of the capacitor half-bridges. Just for the purpose of illustration, FIG. 23 shows waveforms of the voltage V41A, V41B across the capacitors 41A, 41B of the first capacitor half-bridge 4A. FIG. 23 further shows a corresponding signal waveform of the input voltage $\text{Vin1}_1$. Just for the purpose of explanation is it assumed that the input voltage $\text{Vin1}_1$ is a sinusoidal input voltage with an amplitude $v_0$. Further, in this example it is assumed that the individual capacitors 41A, 42A, 41B, 42B of the capacitor half-bridges 4A, 4B essentially have the same capacitance.

Referring to FIG. 23, the voltages V41A, V41B, in the same way as the input voltage $\text{Vin1}_1$, oscillate around an offset level that is given by half the output voltage Vout/2. An amplitude of these oscillations is given by half the amplitude of the input voltage $\text{Vin1}_1$, so that:

$$V41A = \frac{V\text{out}}{2} + \frac{v_{in11}}{2} \cdot \sin(2\pi \cdot f \cdot t) \tag{4a}$$

$$V41B = \frac{V\text{out}}{2} - \frac{v_{in11}}{2} \cdot \sin(2\pi \cdot f \cdot t). \tag{4b}$$

Based on FIG. 23 and equations (4a) and (4b) it can be seen that a voltage level of the output voltage Vout can be as low as the amplitude $v_0$ of the input voltage $\text{Vin1}_1$ or, of course, can be higher. In contrast, if the first capacitor network 4 were omitted, the minimum voltage level of the output voltage Vout would be twice the amplitude of the input voltage ($2 \cdot v_0$).

Figure 24:
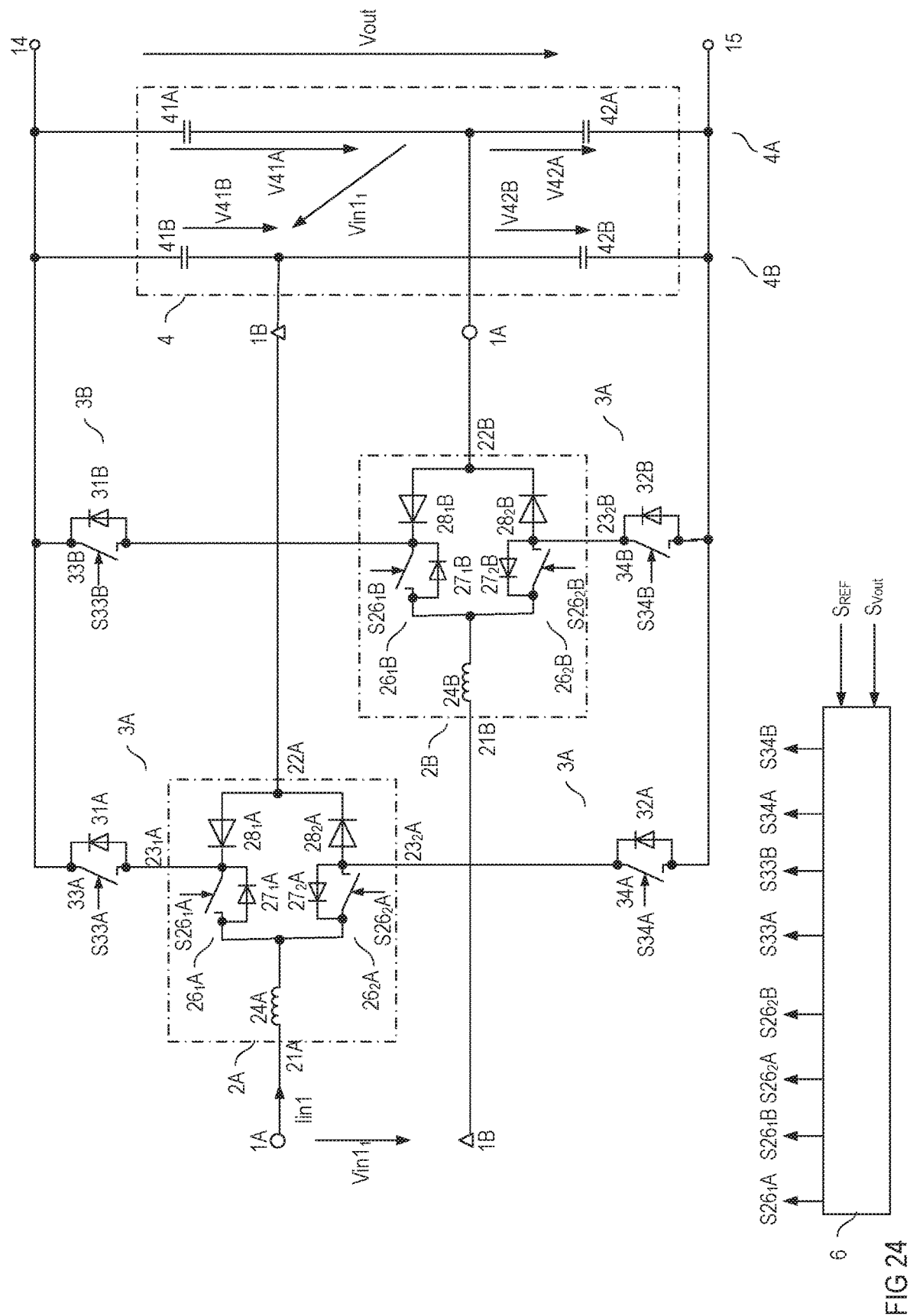
FIG. 24 shows one example of a power converter circuit of the type shown in FIG. 1 implemented with switch and inductor circuits of the type shown in FIG. 17.

FIG. 24 shows a modification of the power converter circuit shown in FIG. 19. The power converter circuit shown in FIG. 24 is different from the power converter circuit shown in FIG. 19 in that the switch and inductor circuits 2A, 2B and the rectifier circuits 3A, 3B are implemented as illustrated in FIG. 17. In FIG. 24, the components of the switch and inductor circuits 2A, 2B and the rectifier circuits 3A, 3B have the same reference numbers as in FIG. 17 supplemented by an "A" in the case of the first switch and inductor circuit 2A and the first rectifier circuit 3A and supplemented by a "B" in the case of the second switch and inductor circuit 2B and the second rectifier circuit 3B. Referring to FIG. 24, a control circuit 6 generates drive signals S26$_1$A-S34B received by the electronic switches 261A, 262A, 261B, 262B in the switch and inductor circuits 2A, 2B and the switches 33A, 34A, 33B, 34B in the rectifier circuits 3A, 3B. This controller 6 is configured to operate the power converter circuits in two different operating states, a first operating state in which power is transferred from the input nodes 1A, 1B to the output 14, 15, and a second operating state, in which power is transferred from the output 14, 15 to the input nodes 1A, 1B. In the first operating mode, the controller 6 operates the electronic switches 26$_1$A, 26$_2$A, 261B, 262B in the switch and inductor circuits 2a, 2B very similar to the electronic switches 25A, 25B in the power converter circuit shown in FIG. 19. Operating the electronic switches 26$_1$A-26$_2$B in this first operating state is illustrated in FIG. 25.

Figure 25:
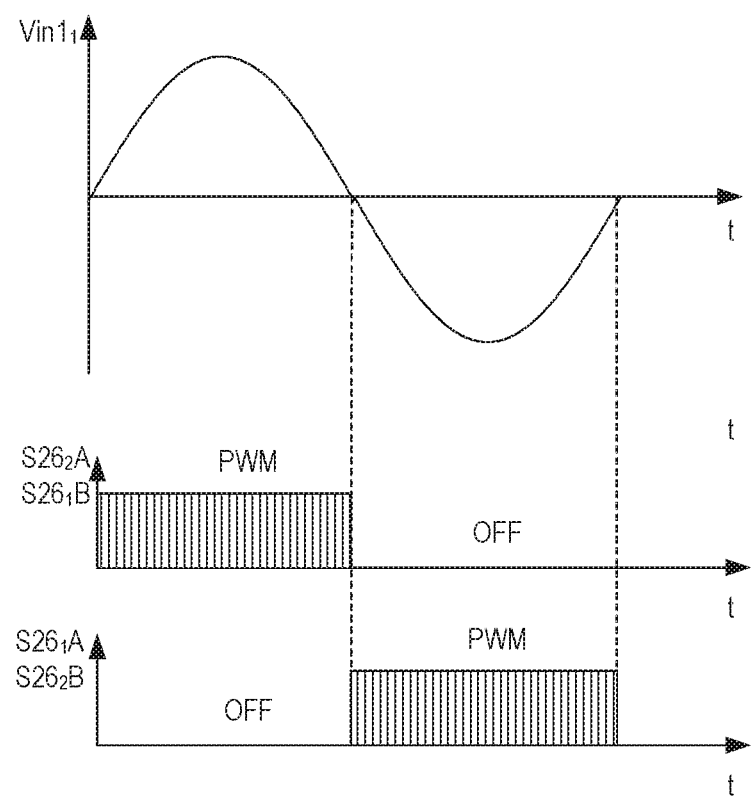
FIG. 25 shows signal diagrams of signals that may occur in a power converter circuit of the type shown in FIG. 24.

FIG. 25 illustrates one period of a sinusoidal input voltage Vin1$_1$ and two diagrams that illustrate how the electronic switches 261A-262B are operated in the first operating state. Referring to FIG. 25, during a positive halfwave of the input voltage Vin1$_1$ the controller 6 permanently switches off the first switch 261A in the first switch and inductor circuit 2A and the second switch 262B in the second switch and inductor circuit 2B. Further, during the positive halfwave, the controller 6 operates the second electronic switch 262A in the first switch and inductor circuit 2A and the first electronic switch 261B in the second switch and inductor circuit 2B in a PWM fashion in the same way as the electronic switches 25A, 25B explained with reference to FIG. 19 in order to regulate the output voltage Vout. Operating one of the converter stages 2A, 3A or 2B, 3B shown in FIG. 24 in the first operating state and during the positive half-wave of the input voltage Vin1$_1$ is explained with reference to the first converter stage 2A, 3A in the following.

When the second electronic switch 262A switches on, the input current Iin1 flows through the inductor 24A, the second switch 26$_2$A and the rectifier element 28$_2$A connected thereto. When the second electronic switch 26$_2$A switches off, the input current Iin1 continues to flow through the inductor 24A and further flows through the rectifier element 27$_1$A connected in parallel with the first switch 26$_1$A and the first rectifier element 31A. According to one example, the controller 6 is further configured to switch on the switch 33A connected in parallel with the first rectifier element 31A each time the second electronic switch 26$_2$A switches off. This may help to reduce conduction losses in the rectifier circuit 3A.

In the first operating state and during the negative half-wave of the input voltage, the controller operates the first electronic switch 26$_1$A in the first switch and inductor circuit 2A and the second electronic switch 26$_2$B in the second switch and inductor circuit 2B in a PWM fashion, while the second switch 26$_2$A in the first switch and inductor circuit 2A and the first switch 26$_1$B in the second switch and inductor circuit 2B are switched off.

In the second operating state, a positive voltage between the input nodes 1A, 1B based on a positive voltage 14, 15 may be generated by switching on the first electronic switch 26$_1$A in the first switch and inductor circuit 2A and the switch 33A in the first rectifier circuit 3A, the second switch 26$_2$B in the second switch and inductor circuit 2B and the switch 34B in the second rectifier circuit 3B. An amplitude of the voltage between the input nodes 1A, 1B can be adjusted by a PWM operation of these electronic switches. Equivalently, a negative voltage between the first and second input node 1A, 1B can be obtained by switching on the second electronic switch 26$_2$A in the first switch and inductor circuit 2A, the switch 34A in the first rectifier circuit 3A, the first switch 26$_1$B in the second switch and inductor circuit 2B and the switch 33B in the second rectifier circuit 3B.

Figure 26:
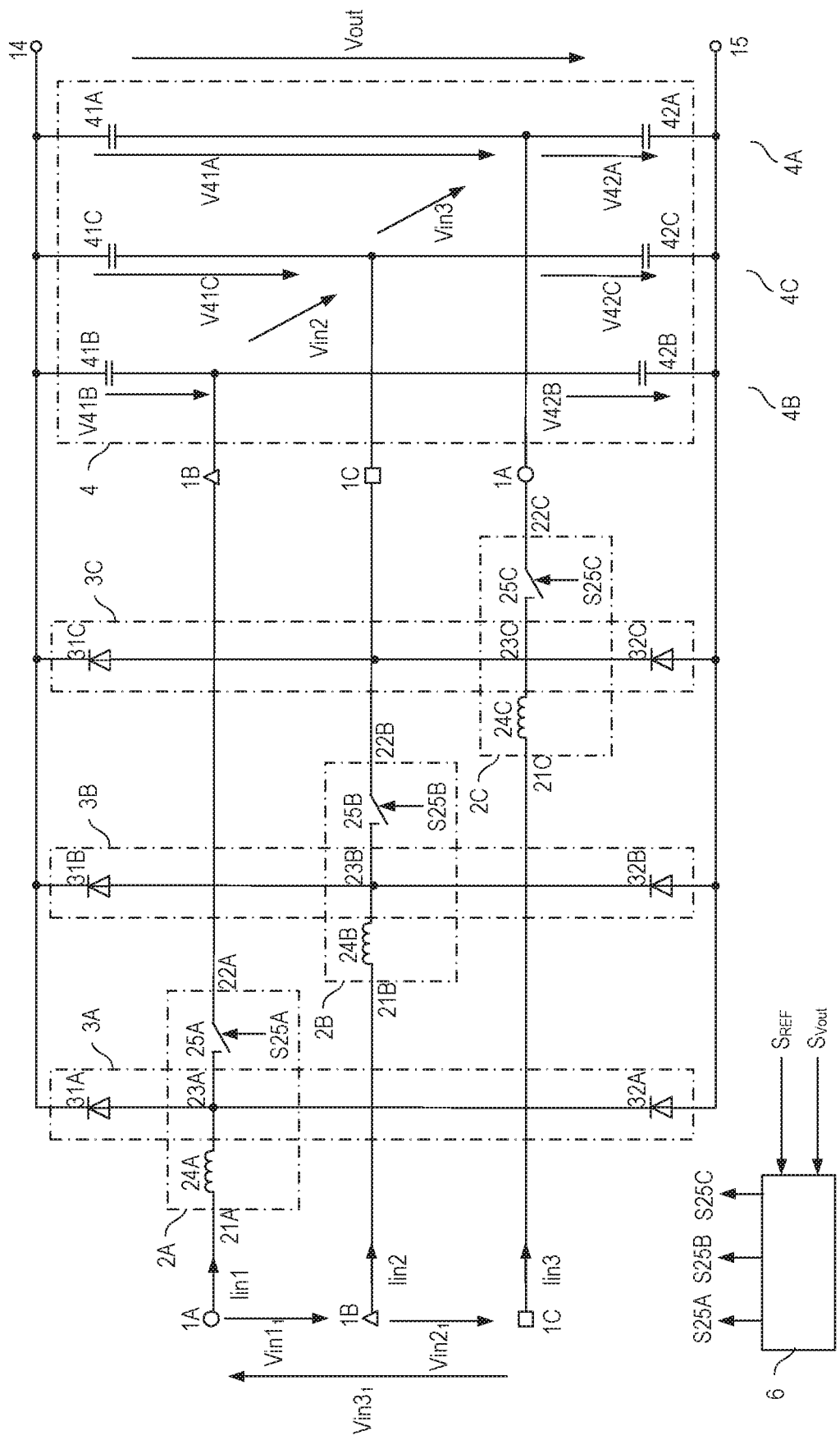
FIG. 26 shows one example of a power converter circuit of the type shown in FIG. 7 implemented with switch and inductor circuits of the type shown in FIG. 15.

FIG. 26 shows a further modification of the power converter circuit shown in FIG. 19. The power converter circuit shown in FIG. 26 is different from the power converter circuit shown in FIG. 19 in that it includes a third converter stage with a third switch and inductor circuit 2C and a third rectifier circuit. In other words, FIG. 26 shows a power converter circuit with a topology as shown in FIG. 7, wherein the switch and inductor circuits 2A-2C and the rectifier circuits 3A-3C are implemented in accordance with FIG. 15 and the first capacitor network 4 is implemented in accordance with FIG. 11. The individual components of the third converter stage 2C, 3C have the same reference numbers as in FIG. 15 supplemented by a "C".

Figure 27:
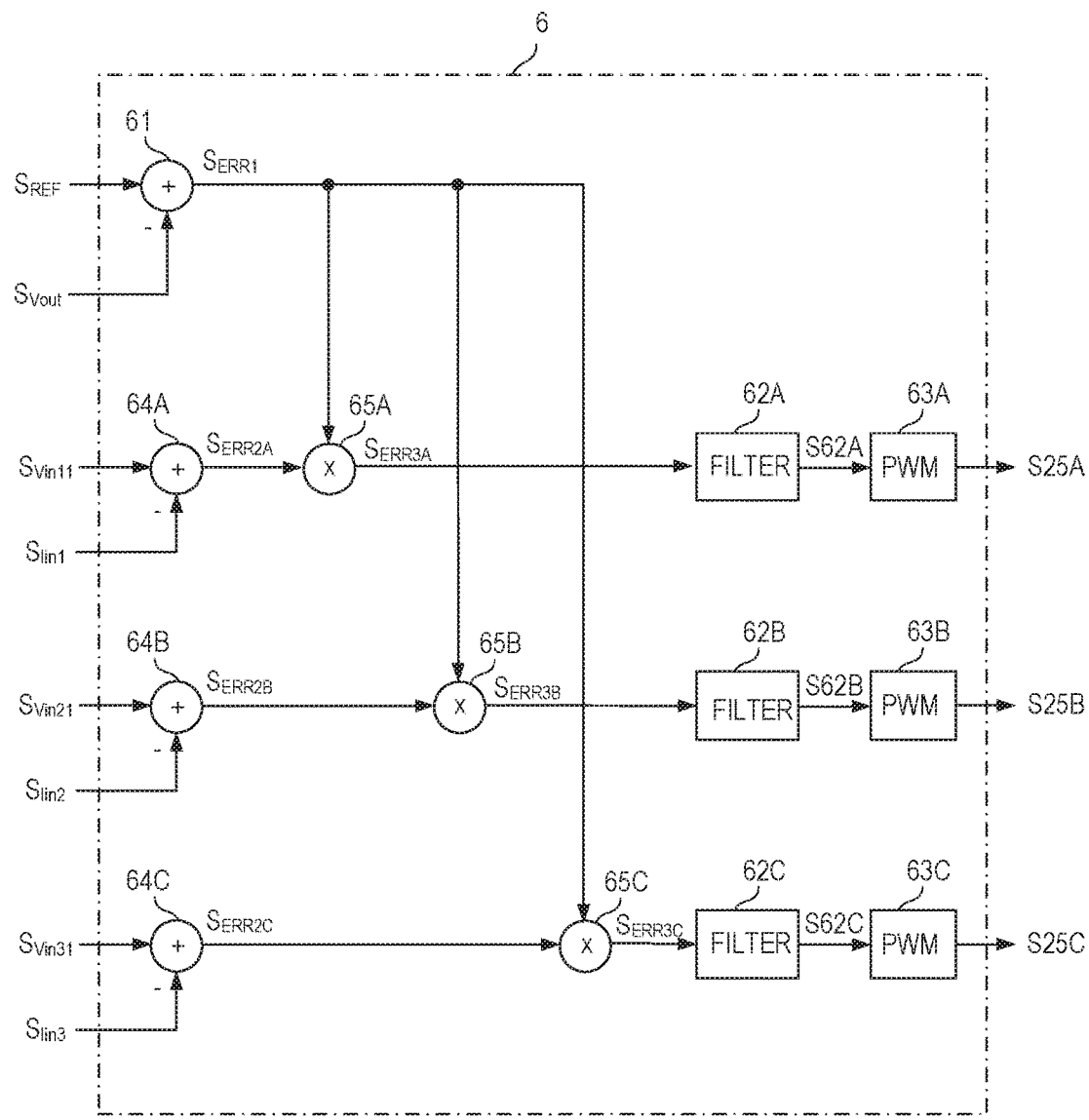
FIG. 27 shows one example of a controller implemented in the power converter circuit shown in FIG. 26.

FIG. 27 shows one example of a control circuit 6 configured to generate the drive signals S25A, S25B, S25C received by the switches 25A, 25B, 25C in the switch and inductor circuits 2A, 2B, 2C shown in FIG. 26. This control circuit 6 is based on the control circuit shown in FIG. 22 and is different from the control circuit shown in FIG. 22 in that it includes a PWM circuit 63A generating the drive signal S25A received by the electronic switch 25A in the first switch and inductor circuit 2A, a second PWM circuit 63B generating the drive signal S25B received by the switch 25B in the second switch and inductor circuit 2B, and a third PWM circuit 63C generating the drive signal S25C received by the switch 25C in the third switch and inductor circuit 2C. Further, in this control circuit 6 three second error signals $S_{ERR2A}$, $S_{ERR2B}$, $S_{ERR2C}$ are generated by subtractors 64A, 64B, 64C. A first one of these subtractors receives a first input voltage signal $S_{Vin11}$ that represent the first input voltage Vin1$_1$ and a first input current signal $S_{Iin1}$ that represents the first input current Iin1. A second one 64B of these subtractors receives a second input voltage signal $S_{Vin21}$ that represents the second input voltage Vin2$_1$ and a second input current signal $S_{Iin2}$ that represents the second input current Iin2, and a third one 64C of these subtractors receives a third input voltage signal $S_{Vin31}$ that represents the third input voltage Vin3$_1$ and a third input current signal $S_{Iin3}$ that represents the third input current Iin3. A first multiplier 65A multiplies the first error signal $S_{ERR1}$ and the error signal $S_{ERR2A}$ output by the first subtractor 64A. An error signal $S_{ERR3A}$ output by the first multiplier 65A is received by a first filter 62A that generates a filtered error signal S62A received by the first PWM circuit 63A. A second multiplier 65B multiplies the first error signal $S_{ERR1}$ with the error signal $S_{ERR2B}$ output by the second subtractor 64B. A second filter 62B receives the error signal $S_{ERR3B}$ output by the second multiplier 65B and generates a second filtered error signal S62B, wherein the second filtered error signal S62B is received by the second PWM circuit 63B. Further, a third multiplier 65C multiplies the first error signal $S_{ERR1}$ with the error signal $S_{ERR2C}$ output by the third subtractor 64C. An error signal $S_{ERR3C}$ output by the third multiplier 65C is received by a third filter 62C, wherein the third filter 62C generates a third filtered error signal S62C that is received by the third PWM circuit 63C.

Figure 28:
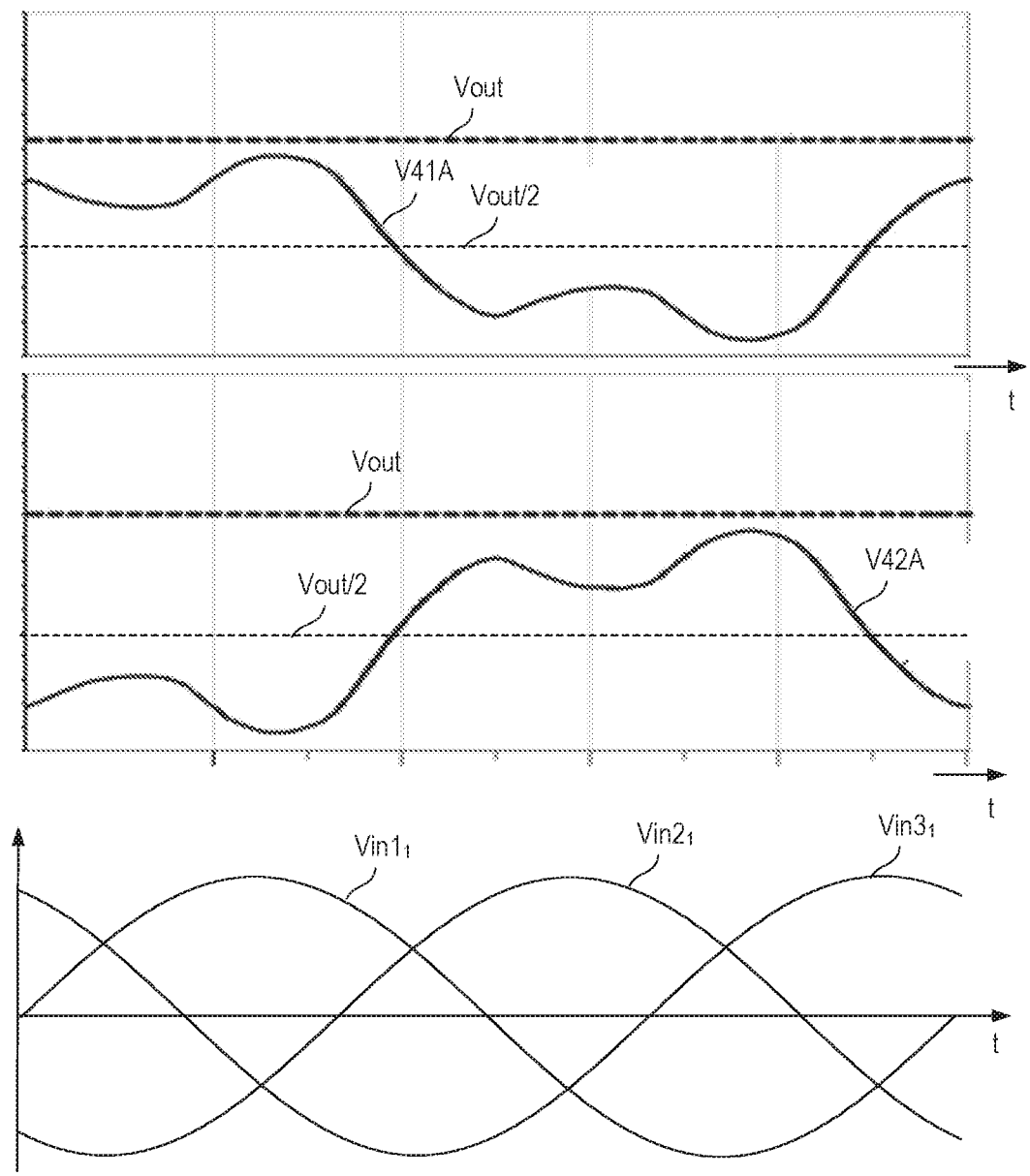
FIG. 28 shows signal waveforms of voltages occurring in the first capacitor network in a power converter circuit of the type shown in FIG. 26.

In the power converter circuit shown in FIG. 27, the signal waveform of the voltages across the capacitors 41A-42C of the capacitor half-bridges 4A-4C in the first capacitor network 4 are different from the signal waveform shown in FIG. 23. FIG. 28 shows one example of the voltage V41A across the capacitor 41A in the capacitor half-bridge and the voltage V42A across the second capacitor 42A over one period of the input voltages $Vin1_1$, $Vin1_2$, $Vin1_3$. These voltages V41A, V42A are periodic and oscillate around an offset that is given by half of the output voltage Vout/2. Further, a maximum amplitude is given by half the amplitude $v_0/2$ of the input voltage $Vin1_1$. Thus, like in the power converter circuits explained with reference to FIGS. 19 and 24, the output voltage Vout can be regulated to voltage levels as low as the amplitude $v_0$ of the input voltage.

Figure 29:
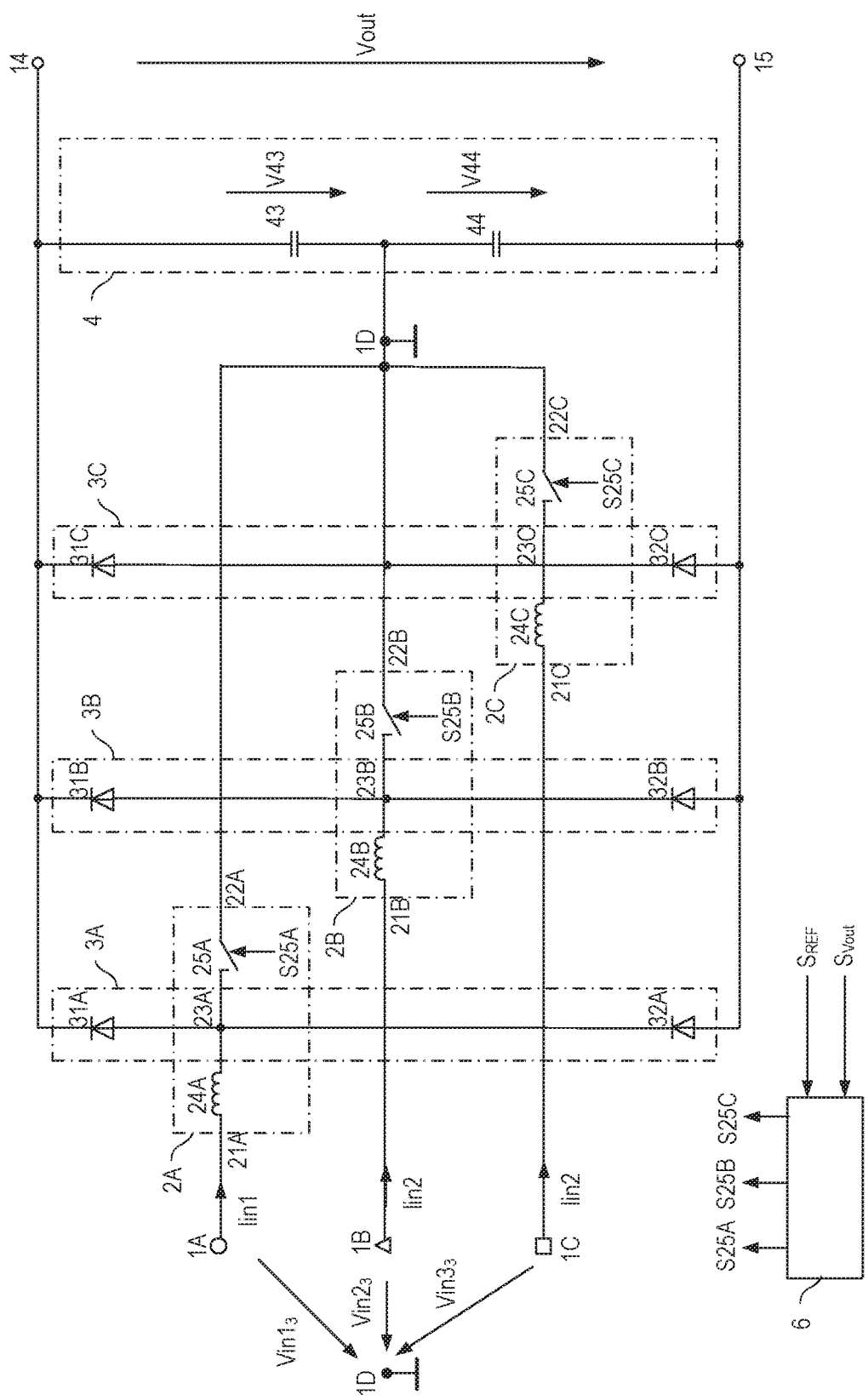
FIG. 29 shows one example of a power converter circuit of the type shown in FIG. 12 implemented with switch and inductor circuits of the type shown in FIG. 15.

FIG. 29 shows a power converter circuit with a topology as shown in FIG. 12, wherein the switch and inductor circuits 2A-2C and the rectifier circuits 3A-3C are implemented in accordance with FIG. 15 and the first capacitor network 4 is implemented as explained with reference to FIG. 14. A control circuit 6 that controls operation of the electronic switches 25A-25C in the individual switch and inductor circuits 2A-2C can be implemented in accordance with FIG. 27. The power converter circuit shown in FIG. 29 is different from the power converter circuits explained herein before in that a lowest possible voltage level of the output voltage Vout is not given by the amplitude of the input voltages, but is essentially given by $\sqrt{3}$ times the amplitude of the individual input voltages $Vin1_3$, $Vin2_3$, $Vin3_3$.

Figure 30:
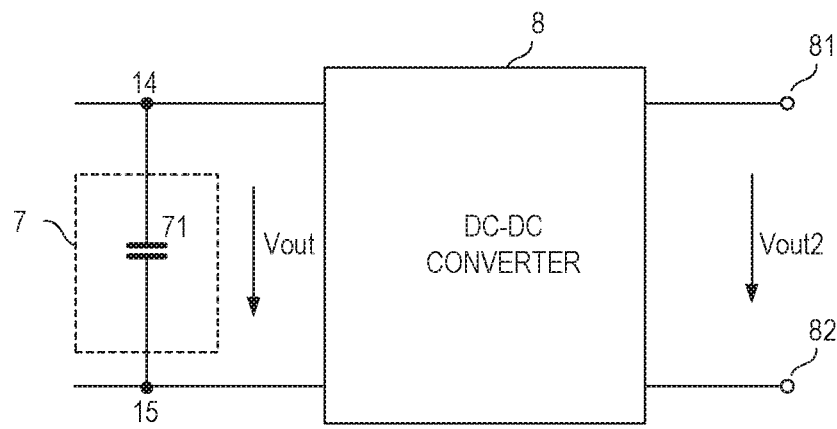
FIG. 30 illustrates one example of another power converter circuit that may be connected to an output of the power converter circuit.

Referring to the above, a load may be connected to the output 14, 15 of the power converter circuits. This load may include a further power converter circuit. Two different examples of a load including a further power converter circuit are shown in FIGS. 30 and 31. In the example shown in FIG. 30, the second capacitor network 7 includes one capacitor 71 and is connected to the output 14, 15 of the power converter circuit. A further power converter 8 is configured to generate a DC output voltage Vout2 at an output 81, 82 based on the output voltage Vout provided by the second capacitor network 7. According to one example, the further power converter is DC-DC converter 8 such as, for example, an LLC converter. A load (not shown) such as a lamp, a motor, a processor, or the like may be connected to the further power converter 8 and receive the output voltage Vout2.

FIG. 31 shows a modification of the circuit shown in FIG. 30. In this example, the second capacitor network is implemented in accordance with the example shown in FIG. 6 and includes two capacitors 72, 73 connected in series, wherein a first further converter 83 is connected between the first output node 14 and the third output node 16 and a second further converter 84 is connected between the third output node 16 and the second output node 15. According to one example, the first further converter 83 is configured to generate a first output voltage Vout85 across a first output capacitor 85 and the second DC-DC converter 84 is configured to generate a second output voltage Vout86 across a second output capacitor 86. According to one example, these output capacitors 85, 86 are connected in series and a further output capacitor 87 is connected in parallel with this series circuit. An output voltage Vout2 is available across the further output capacitor 87.

Although the present disclosure is not so limited, the following numbered examples demonstrate one or more aspects of the disclosure.

Example 1

A power converter circuit, including: a plurality of input nodes; an output; a plurality of switch and inductor circuits each connected between a respective pair of the plurality of input nodes; a plurality of rectifier circuits each connected between a respective one of the plurality of switch and inductor circuits and the output; a first capacitor network including at least two capacitors connected between at least one of the plurality of input nodes and the output; and a second capacitor network including at least one capacitor and connected to the output, wherein a capacitance of the at least one capacitor of the second capacitor network is greater than a capacitance of each of the at least two capacitors of the first capacitor network.

Example 2

The power converter circuit of example 1, wherein a capacitance of the at least one capacitor of the second capacitor network is at least 1E2 times, 1E3 times, or 1E4 times greater than a capacitance of each of the at least two capacitors of the first capacitor network.

Example 3

The power converter circuit of any combination of examples 1 to 2, wherein the first capacitor network is connected between each of the plurality of input nodes and the output.

Example 4

The power converter circuit of any combination of examples 1 to 3, wherein the first capacitor network includes a plurality of capacitor half-bridges each connected between a respective one of the plurality of input nodes and the output.

Example 5

The power converter circuit of any combination of examples 1 to 4, wherein the first capacitor network is connected between one of the plurality of input nodes and the output.

Example 6

The power converter circuit of any combination of examples 1 to 5, wherein the first capacitor network includes one capacitor half-bridge connected the one of the plurality of input nodes and the output.

Example 7

The power converter circuit of any combination of examples 1 to 6, wherein the output includes a first output node and a second output node, and wherein each of the plurality of rectifier circuits includes: a first rectifier element connected between the respective one of the plurality of switch and capacitor circuits and the first output node; and a second rectifier element connected between the respective one of the plurality of switch and capacitor circuits and the second output node.

Example 8

The power converter circuit of any combination of examples 1 to 7, wherein each of the plurality of rectifier circuits further includes: a first electronic switch connected in parallel with the first rectifier element; and a second electronic switch connected in parallel with the second rectifier element.

Example 9

The power converter circuit of any combination of examples 1 to 8, wherein each of the plurality of switch and inductor circuits includes: a first circuit node and a second circuit node; and a series circuit with an inductor and at least one electronic switch connected between the first circuit node and the second circuit node.

Example 10

The power converter circuit of any combination of examples 1 to 9, wherein each of the plurality of switch and inductor circuits further includes: at least one further circuit node different from the first and second circuit nodes, wherein the respective one of the plurality of rectifier circuits is connected to the at least one further circuit node.

Example 11

The power converter circuit of any combination of examples 1 to 10, wherein the at least one further circuit node includes a first further circuit node and a second further circuit node, wherein the at least one electronic switch includes a first electronic switch connected between the inductor and the first further circuit node and a second electronic switch connected between the inductor and the second further circuit node, and wherein each of the plurality of switch and inductor circuits further includes: a third rectifier element connected between the first electronic switch and the second circuit node and a fourth rectifier element connected between the second electronic switch and the second circuit node.

Example 12

The power converter circuit of any combination of examples 1 to 11, wherein the plurality of switch and inductor circuits are connected to the plurality of input nodes such that the first circuit nodes of the plurality of switch and inductor circuits are connected to distinct ones of the plurality of input nodes.

Example 13

The power converter circuit of any combination of examples 1 to 12, further including: a control circuit configured to control operation of the plurality of switch and inductor circuits based on a signal representing an output voltage at the output and a reference signal.

Example 14

The power converter circuit of any combination of examples 1 to 13, wherein the plurality of input nodes includes exactly two input nodes configured to receive an alternating voltage.

Example 15

The power converter circuit of any combination of examples 1 to 14, wherein the plurality of input nodes includes three input nodes configured to receive three distinct alternating voltages.

Example 16

A method including converting power by a power converter, wherein the power converter includes: a plurality of input nodes; an output; a plurality of switch and inductor circuits each connected between a respective pair of the plurality of input nodes; a plurality of rectifier circuits each connected between a respective one of the plurality of switch and inductor circuits and the output; a first capacitor network including at least two capacitors connected between at least one of the plurality of input nodes and the output; and a second capacitor network including at least one capacitor and connected to the output, wherein a capacitance of the at least one capacitor of the second capacitor network is greater than a capacitance of each of the at least two capacitors of the first capacitor network, and wherein converting power includes receiving at least one alternating input voltage at the plurality of input nodes.

Example 17

The method of example 16, wherein the plurality of input nodes include exactly two input nodes and wherein the at least one alternating input voltage includes exactly one input voltage.

Example 18

The method of any combination of examples 16 to 17, wherein the plurality of input nodes include three input nodes and wherein the at least one alternating input voltage includes three distinct input voltages.

Example 19

The method of any combination of examples 16 to 18, wherein the three input voltages have a phase shift of 120° relative to each other.

Example 20

An electronic circuit, including: a power converter circuit according to any one of claims 1 to 15; and a further power converter circuit connected to the output of the power converter circuit.

Example 21

The electronic circuit of example 20, wherein the at least one further power converter circuit includes a first converter stage and a second converter stage, wherein the second capacitor network includes a capacitor series circuit connected to the output, wherein the capacitor series circuit includes a first capacitor and a second capacitor, and wherein the first converter stage is connected to the first capacitor and the second converter stage is connected to the second capacitor.

Example 22

The electronic circuit of example 20 or 21, wherein each of the first and second converter stages is an LLC converter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A power converter circuit, comprising:
    a plurality of pairs of input nodes, each pair of input nodes configured to receive a respective input voltage therebetween so that the power converter circuit is configured to receive a plurality of different input voltages;
    an output;
    a plurality of switch and inductor circuits, each connected between a respective pair of the plurality of pairs of input nodes so that each switch and inductor circuit receives a different input voltage than the other switch and inductor circuits;
    a plurality of rectifier circuits each connected between a respective one of the plurality of switch and inductor circuits and the output;
    a first capacitor network comprising at least two capacitors connected between at least one of the plurality of pairs of input nodes and the output; and
    a second capacitor network comprising at least one capacitor and connected to the output,
    wherein a capacitance of the at least one capacitor of the second capacitor network is greater than a capacitance of each of the at least two capacitors of the first capacitor network.

2. The power converter circuit of claim 1, wherein a capacitance of the at least one capacitor of the second capacitor network is at least 1E2 times, 1E3 times, or 1E4 times greater than a capacitance of each of the at least two capacitors of the first capacitor network.

3. The power converter circuit of claim 1, wherein the first capacitor network is connected between each pair of the plurality of pairs of input nodes and the output.

4. The power converter circuit of claim 3, wherein the first capacitor network comprises a plurality of capacitor half-bridges, each connected between a respective one of the plurality of pairs of input nodes and the output.

5. The power converter circuit of claim 1, wherein the first capacitor network is connected between one pair of the plurality of pairs of input nodes and the output.

6. The power converter circuit of claim 1, wherein the first capacitor network comprises one capacitor half-bridge connected between one pair of the plurality of pairs of input nodes and the output.

7. The power converter circuit of claim 1,
    wherein the output comprises a first output node and a second output node, and
    wherein each of the plurality of rectifier circuits comprises:
        a first rectifier element connected between the respective one of the plurality of switch and capacitor circuits and the first output node; and
        a second rectifier element connected between the respective one of the plurality of switch and capacitor circuits and the second output node.

8. The power converter circuit of claim 7, wherein each of the plurality of rectifier circuits further comprises:
    a first electronic switch connected in parallel with the first rectifier element; and
    a second electronic switch connected in parallel with the second rectifier element.

9. The power converter circuit of claim 1, wherein each of the plurality of switch and inductor circuits comprises:
    a first circuit node and a second circuit node; and
    a series circuit with an inductor and at least one electronic switch connected between the first circuit node and the second circuit node.

10. The power converter circuit of claim 9, wherein each of the plurality of switch and inductor circuits further comprises:
    at least one further circuit node different from the first and second circuit nodes,
    wherein the respective one of the plurality of rectifier circuits is connected to the at least one further circuit node.

11. The power converter circuit of claim 10,
    wherein the at least one further circuit node comprises a first further circuit node and a second further circuit node,
    wherein the at least one electronic switch comprises a first electronic switch connected between the inductor and the first further circuit node and a second electronic switch connected between the inductor and the second further circuit node, and
    wherein each of the plurality of switch and inductor circuits further comprises:
        a third rectifier element connected between the first electronic switch and the second circuit node and a fourth rectifier element connected between the second electronic switch and the second circuit node.

12. The power converter circuit of claim 9, wherein the plurality of switch and inductor circuits are connected to the plurality of pairs of input nodes such that the first circuit nodes of the plurality of switch and inductor circuits are connected to distinct ones of the plurality of pairs of input nodes.

13. The power converter circuit of claim 1, further comprising:
    a control circuit configured to control operation of the plurality of switch and inductor circuits based on a signal representing an output voltage at the output and a reference signal.

14. The power converter circuit of claim 1, wherein the plurality of pairs of input nodes comprises exactly two input nodes configured to receive an alternating voltage.

15. The power converter circuit of claim 1, wherein the plurality of pairs of input nodes comprises three input nodes configured to receive three distinct alternating voltages.

16. An electronic circuit, comprising:
    the power converter circuit of claim 1; and
    a further power converter circuit connected to the output of the power converter circuit.

17. The electronic circuit of claim 16,
    wherein the at least one further power converter circuit comprises a first converter stage and a second converter stage,
    wherein the second capacitor network comprises a capacitor series circuit connected to the output,
    wherein the capacitor series circuit comprises a first capacitor and a second capacitor, and
    wherein the first converter stage is connected to the first capacitor and the second converter stage is connected to the second capacitor.

18. The electronic circuit of claim 17, wherein each of the first and second converter stages is an LLC converter.

* * * * *